US007364761B2

(12) United States Patent
Wolf et al.

(10) Patent No.: US 7,364,761 B2
(45) Date of Patent: Apr. 29, 2008

(54) CHEWING GUM CONTAINING PHYSIOLOGICAL COOLING AGENTS AND METHOD OF PREPARING

(75) Inventors: Fred R. Wolf, West Des Moines, IA (US); Gordon N. McGrew, Evanston, IL (US); Jeffrey S. Hook, Berwyn, IL (US); Lindell C. Richey, Lake Zurich, IL (US); Henry T. Tyrpin, Palos Park, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 11/613,851

(22) Filed: Dec. 20, 2006

(65) Prior Publication Data
US 2007/0098842 A1 May 3, 2007

Related U.S. Application Data

(63) Continuation of application No. 10/952,322, filed on Sep. 28, 2004, now abandoned, which is a continuation of application No. 10/678,025, filed on Sep. 30, 2003, now Pat. No. 7,078,066, which is a continuation of application No. 09/527,170, filed on Mar. 16, 2000, now Pat. No. 6,627,233, which is a continuation of application No. PCT/US97/16731, filed on Sep. 18, 1997.

(51) Int. Cl.
*A23G 4/06* (2006.01)
(52) U.S. Cl. ....................................................... 426/5
(58) Field of Classification Search .................... 426/3, 426/5, 660; 424/48, 440
See application file for complete search history.

(56) References Cited

U.S. PATENT DOCUMENTS

| 2,101,790 A | 12/1937 | Cole et al. |
| 2,433,165 A | 12/1947 | Simpson |
| 2,525,072 A | 10/1950 | Kearby et al. |
| 2,608,226 A | 8/1952 | Fraser |
| 2,922,747 A | 1/1960 | Scamlan |
| 3,419,543 A | 12/1968 | Mold |
| 3,639,569 A | 2/1972 | Medcalf, Jr. |
| 3,644,613 A | 2/1972 | Moeller et al. |
| 3,720,762 A | 3/1973 | Hatasa et al. |
| 3,793,446 A | 2/1974 | Moeller et al. |
| 4,020,153 A | 4/1977 | Rowsell et al. |
| 4,029,759 A | 6/1977 | Humbert et al. |
| 4,032,661 A | 6/1977 | Rowsell et al. |
| 4,033,994 A | 7/1977 | Watson et al. |
| 4,034,109 A | 7/1977 | Rowsell et al. |
| 4,044,120 A | 8/1977 | Rowsell et al. |
| 4,059,118 A | 11/1977 | Watson et al. |
| 4,060,091 A | 11/1977 | Watson et al. |
| 4,069,345 A | 1/1978 | Gascoyne et al. |
| 4,070,449 A | 1/1978 | Rowsell et al. |
| 4,070,496 A | 1/1978 | Rowsell et al. |
| 4,081,480 A | 3/1978 | Evers et al. |
| 4,083,955 A | 4/1978 | Grabenstetter et al. |
| 4,105,801 A | 8/1978 | Dogliotti |
| 4,112,066 A | 9/1978 | Hussein |
| 4,127,677 A | 11/1978 | Fronczkowski et al. |
| 4,136,163 A | 1/1979 | Watson et al. |
| 4,136,164 A | 1/1979 | Rowsell et al. |
| 4,137,304 A | 1/1979 | Rowsell et al. |
| 4,137,305 A | 1/1979 | Rowsell et al. |
| 4,139,639 A | 2/1979 | Bahoshy et al. |
| 4,146,653 A | 3/1979 | Mader et al. |
| 4,150,052 A | 4/1979 | Watson et al. |
| 4,153,679 A | 5/1979 | Rowsell et al. |
| 4,157,384 A | 6/1979 | Watson et al. |
| 4,178,459 A | 12/1979 | Watson et al. |
| 4,190,643 A | 2/1980 | Watson et al. |
| 4,193,936 A | 3/1980 | Watson et al. |
| 4,226,988 A | 10/1980 | Watson et al. |
| 4,230,687 A | 10/1980 | Sair et al. |
| 4,230,688 A | 10/1980 | Rowsell et al. |
| 4,248,859 A | 2/1981 | Rowsell et al. |

(Continued)

FOREIGN PATENT DOCUMENTS

BR   PI 95009884-4   6/1996

(Continued)

OTHER PUBLICATIONS de Roos, Kris B. et al., "Non-equilibrium partition model for predicting flavour release in mouth", Trends in Flavour Research, Elsevier Science, 1994, 18 pages.

(Continued)

*Primary Examiner*—Arthur L. Corbin
(74) *Attorney, Agent, or Firm*—Steven P. Shurtz; Brinks Hofer Gilson & Lione

(57) ABSTRACT

A method for producing a chewing gum, as well as the chewing gum so produced, incorporates a physiological cooling agent, such as acyclic carboxamide, or combinations of physiological cooling agents. In another embodiment a combination of physiological cooling agents is made in a modified release structure. The modified release/cooling agents combination is preferably obtained by physically modifying the properties of the combination of cooling agents by coating and drying. When incorporated into gum, these particles are adapted to enhance the shelf stability of the flavor and/or produce a modified release when the gum is chewed. In another embodiment, the physiological cooling agent is present with menthol and menthone.

5 Claims, 3 Drawing Sheets

U.S. PATENT DOCUMENTS

| | | |
|---|---|---|
| 4,296,093 A | 10/1981 | Rowsell et al. |
| 4,296,255 A | 10/1981 | Roswell et al. |
| 4,317,838 A | 3/1982 | Cherukuri et al. |
| 4,318,900 A | 3/1982 | Rowsell et al. |
| 4,384,004 A | 5/1983 | Cea et al. |
| 4,386,106 A | 5/1983 | Merrit et al. |
| 4,423,086 A | 12/1983 | Devos et al. |
| 4,459,425 A | 7/1984 | Amano et al. |
| 4,476,142 A | 10/1984 | Netherwood et al. |
| 4,479,003 A | 10/1984 | Houminer et al. |
| 4,515,769 A | 5/1985 | Merritt et al. |
| 4,597,970 A | 7/1986 | Sharma et al. |
| 4,607,118 A | 8/1986 | Grubbs et al. |
| 4,634,593 A | 1/1987 | Stroz et al. |
| 4,671,967 A | 6/1987 | Patel et al. |
| 4,681,766 A | 7/1987 | Huzinec et al. |
| 4,724,151 A | 2/1988 | Mansukhani et al. |
| 4,753,790 A | 6/1988 | Silva et al. |
| 4,786,511 A | 11/1988 | Huzinec et al. |
| 4,792,453 A | 12/1988 | Reed et al. |
| 4,828,845 A | 5/1989 | Zamudio-Tena et al. |
| 4,840,797 A | 6/1989 | Boursier |
| 4,929,446 A | 5/1990 | Bartolucci |
| 4,961,935 A | 10/1990 | Cherukuri et al. |
| 4,978,537 A | 12/1990 | Song |
| 5,009,893 A | 4/1991 | Cherukuri et al. |
| 5,128,155 A | 7/1992 | Song et al. |
| 5,165,943 A | 11/1992 | Patel et al. |
| 5,169,658 A | 12/1992 | Yatka et al. |
| 5,192,563 A | 3/1993 | Patel et al. |
| 5,236,719 A | 8/1993 | Meyers et al. |
| 5,244,670 A | 9/1993 | Upson et al. |
| 5,248,508 A | 9/1993 | Reed et al. |
| 5,266,592 A | 11/1993 | Grub et al. |
| 5,270,061 A | 12/1993 | Reed et al. |
| 5,286,501 A | 2/1994 | Song et al. |
| 5,326,574 A | 7/1994 | Chapdelaine et al. |
| 5,342,631 A | 8/1994 | Yatka et al. |
| 5,348,750 A | 9/1994 | Greenberg |
| 5,372,824 A | 12/1994 | Record et al. |
| 5,376,389 A | 12/1994 | Reed et al. |
| 5,409,715 A | 4/1995 | Meyers |
| 5,451,404 A | 9/1995 | Furman |
| 5,458,892 A | 10/1995 | Yatka et al. |
| 5,478,593 A | 12/1995 | Serpellioni et al. |
| 5,527,542 A | 6/1996 | Serpellioni et al. |
| 5,536,511 A | 7/1996 | Yatka |
| 5,543,160 A | 8/1996 | Song et al. |
| 5,545,416 A | 8/1996 | Song et al. |
| 5,571,547 A | 11/1996 | Serpellioni et al. |
| 5,578,339 A | 11/1996 | Kunz et al. |
| 5,603,970 A | 2/1997 | Tyrpin et al. |
| 5,612,071 A | 3/1997 | Song et al. |
| 5,614,234 A | 3/1997 | Song et al. |
| 5,665,406 A | 9/1997 | Reed et al. |
| 5,688,491 A | 11/1997 | Shahidi |
| 5,698,181 A | 12/1997 | Luo |
| 5,716,652 A | 2/1998 | Barkalow et al. |
| 5,725,865 A | 3/1998 | Mane et al. |
| 5,766,622 A | 6/1998 | Nelson |
| 5,800,847 A | 9/1998 | Song et al. |
| 5,827,852 A | 10/1998 | Russell et al. |
| 5,843,466 A | 12/1998 | Mane et al. |
| 5,976,581 A | 11/1999 | Song et al. |
| 5,977,166 A | 11/1999 | Greenberg |
| 6,030,647 A | 2/2000 | Song et al. |
| 6,080,432 A | 6/2000 | Tyrpin et al. |
| 6,231,900 B1 | 5/2001 | Hanke |
| 6,267,974 B1 | 7/2001 | Suares et al. |
| 6,328,982 B1 | 12/2001 | Shiroyama et al. |
| 6,440,472 B1 | 8/2002 | Song et al. |
| 6,455,080 B1 | 9/2002 | Wolf et al. |
| 6,472,000 B1 | 10/2002 | Gudas et al. |
| 6,586,023 B1 | 7/2003 | Song et al. |
| 6,602,518 B2 | 8/2003 | Seielstad et al. |
| 6,613,346 B2 | 9/2003 | Seielstad et al. |
| 6,627,233 B1 | 9/2003 | Wolf et al. |
| 6,660,304 B2 | 12/2003 | Nitikhunkasem et al. |
| 2002/0119231 A1 | 8/2002 | Kumamoto et al. |
| 2003/0082271 A1 | 5/2003 | Wolf et al. |
| 2003/0161802 A1 | 8/2003 | Flammer et al. |
| 2003/0191154 A1 | 10/2003 | Kalafsky et al. |
| 2003/0215532 A1 | 11/2003 | Nakatsu et al. |
| 2004/0175489 A1 | 9/2004 | Clark et al. |

FOREIGN PATENT DOCUMENTS

| | | |
|---|---|---|
| CA | 989738 | 5/1976 |
| CA | 2101790 | 2/1994 |
| DE | 24 33 165 | 1/1975 |
| DE | 26 08 226 A1 | 9/1977 |
| EP | 0 485 170 A1 | 5/1992 |
| EP | 0 793 420 B1 | 3/2000 |
| EP | 0 998 852 B1 | 3/2000 |
| EP | 1 332 772 | 8/2003 |
| FR | 72.01413 | 1/1972 |
| FR | 2 577 922 A1 | 2/1986 |
| GB | 1311060 | 3/1973 |
| GB | 1315625 | 5/1973 |
| GB | 1404596 | 9/1975 |
| GB | 1411785 | 10/1975 |
| GB | 1411786 | 10/1975 |
| GB | 1421743 | 1/1976 |
| GB | 1421744 | 1/1976 |
| GB | 1442998 | 1/1976 |
| GB | 1476351 | 6/1977 |
| GB | 1502680 | 3/1978 |
| GB | 2115672 A | 9/1983 |
| GB | 2233873 A | 1/1991 |
| JP | 94-065023 | 3/1984 |
| JP | 40538/1997 | 2/1997 |
| WO | WO 84/03201 A1 | 8/1984 |
| WO | WO 89/05590 A1 | 6/1989 |
| WO | WO 90/11020 A1 | 10/1990 |
| WO | WO 90/14015 A1 | 11/1990 |
| WO | WO 91/03147 A2 | 3/1991 |
| WO | WO 92/17164 A1 | 10/1992 |
| WO | WO 93/23005 A1 | 11/1993 |
| WO | WO 93/25177 A1 | 12/1993 |
| WO | WO 94/06308 A1 | 3/1994 |
| WO | WO 94/08550 A1 | 4/1994 |
| WO | WO 94/08551 A2 | 4/1994 |
| WO | WO 94/10117 A1 | 5/1994 |
| WO | WO 94/21135 A1 | 9/1994 |
| WO | WO 94/25003 A1 | 11/1994 |
| WO | WO 94/25009 A1 | 11/1994 |
| WO | WO 95/07622 A1 | 3/1995 |
| WO | WO 95/07625 A1 | 3/1995 |
| WO | WO 95/08925 A1 | 4/1995 |
| WO | WO 95/34277 A1 | 12/1995 |
| WO | WO 96/15768 A1 | 5/1996 |
| WO | WO 96/17524 A1 | 6/1996 |
| WO | WO 96/19191 A1 | 6/1996 |
| WO | WO 96/28133 A1 | 9/1996 |
| WO | WO 97/04666 A1 | 2/1997 |
| WO | WO 97/06695 A1 | 2/1997 |
| WO | WO 97/07771 A1 | 3/1997 |
| WO | WO 97/24036 A1 | 7/1997 |
| WO | WO 99/13734 A1 | 3/1999 |
| WO | WO 99/13870 A1 | 3/1999 |
| WO | WO 00/06093 A1 | 2/2000 |
| WO | WO 00/62737 A1 | 10/2000 |
| WO | WO 02/083192 A1 | 10/2002 |
| WO | WO 02/091849 A1 | 11/2002 |

| WO | WO 03/043431 A1 | 5/2003 |
| WO | WO 2004/000234 A2 | 12/2003 |
| WO | WO 2004/000235 A2 | 12/2003 |
| WO | WO 2004/019922 A1 | 3/2004 |
| WO | WO 2004/045590 A1 | 6/2004 |

OTHER PUBLICATIONS

Eccles, R., "Menthol and Related Cooling Compounds", J. Pharm. Pharmacol, vol. 46, 1994, pp. 618-630.

Hopp, Rudolph, Menthol: Its Origins, Chemistry, Physiology, and Toxicological Properties, 47th Tobacco Chemists' Research Conference, vol. 19, pp. 3-46 (1993).

Ingham. Kate E. et al., "The Effect of Eating on the Rate of Aroma Release from Mint-Flavoured Sweets", Dept. of Applied Biochemistry and Food Science, University of Nottingham, England, Copyright by Academic Press, vol. 28, No. 1, 1995, pp. 105-110.

Olser, Bernard L., et al., "Recent Progress in the Consideration of Flavoring Ingredients under the Food Additives Amendment", Food Technology, 1975, pp. 19-20.

Ottinger, H., et al., "Systematic Studies on Structure and Physiological Activity of Cyclic α-Keto Enamines, a Novel Class of 'Cooling' Compounds," 49 J. Agric. Food Chem. 5383-5390 (2001).

Questice, "A Multi-Functional Cooling Agent," Quest International, Willesborough Road, Ashford, Kent, pp. 1-16 (Aug. 2000).

Parrish, M. A., "Stay Cool!", Food Manufacture, 1987, vol. 62, No. 4, p. 56.

Parrish, M. A., "Market Warms to Physiological Coolants", Feb. 1987, pp. 31-32.

Pelzer, Ralf, article on: "OPTACOOL", date unknown but presumed to be prior to Sep. 18, 1997, 4 pages.

"Peppermint Oils," RÖMPP Online, Version 2:11 (translated from German), retrieved from http://www.roempp.com/prod/roempp.php, cover page and pp. 1-3 (2006).

Smith, R.L. et al., "GRAS Flavoring Substances 17", Food Technology, 1996, pp. 72-82.

Voirol, F. "Chewing Gum History: Xylitol Sweetened Chewing Gum" subtitle "The Evolution of Chewing Gum: Xylitoy and the Prevention of Dental Caries", published Mar. 1985, cover page and pp. 1-76.

Watson, Hugh R., "Flavor Characteristics of Synthetic Cooling Compounds", *Flavor: Its Chemical, Behavioral, and Commercial Aspects Proceedings of the Arthur D. little, Inc. Flavor Symposium*, 1977, Published by Westview Press, Boulder CO, 1978, pp. 31-50.

Watson, H. R. et al., "New compounds with the menthol cooling effect", J. Soc. Cosmet. Chem., vol. 29, 1978, pp. 185-200.

*Wm. Wrigley, Jr. Company* vs *Cadbury Adams USA*, Third Amended Answer and Counterclaim, pp. 1-12 (Aug. 12, 2004).

*Wm. Wrigley, Jr. Company* vs *Cadbury Adams USA*, Defendant Cadbury Adams' Responses To Plaintiff Wm. Wrigley Jr., Company's First Set Of Interrogatories , pp. 1-11 (Jul. 19, 2004).

*Wm. Wrigley, Jr. Company* vs *Cadbury Adams USA*, Case Docket, pp. 1-13 (Jan. 6, 2005).

*Wm. Wrigley, Jr. Company* vs *Cadbury Adams USA*, Memorandum in Support of Defendant Cadbury Adams' Motion for Leave to File Defendant's Fourth Amended Answer and Counterclaims, 8 pages (Feb. 18, 2004).

*Wm. Wrigley, Jr. Company* vs. *Cadbury Adams USA*, Cadbury Adam's Fourth Amended Answer and Counterclaim, pp. 1-14 (Mar. 2, 2005).

*Wm. Wrigley, Jr. Company* vs *Cadbury Adams USA*, Cadbury Adams' Response to Plaintiff Wm. Wrigley Jr., Company's Fifth Set Of Interrogatories (No. 14-18), pp. 1-8, undated.

CHEWING GUM CONTAINING PHYSIOLOGICAL COOLING AGENTS AND METHOD OF PREPARING

CROSS REFERENCE TO RELATED APPLICATIONS

The present application is a continuation of U.S. patent application Ser. No. 10/952,322, filed Sep. 28, 2004, now abandoned, which is a continuation of U.S. patent application Ser. No. 10/678,025, filed Sep. 30, 2003, now U.S. Pat. No. 7,078,066, which is a continuation of U.S. patent application Ser. No. 09/527,170, filed Mar. 16, 2000, now U.S. Pat. No. 6,627,233, which in turn is a continuation of PCT Application Ser. No. PCT/US97/16731, filed Sep. 18, 1997, designating the United States, all of which are hereby incorporated by reference.

BACKGROUND OF THE INVENTION

The present invention relates to chewing gum compositions and methods of producing chewing gum. More particularly, the invention relates to producing chewing gum containing physiological cooling agents. Preferably the physiological cooling agents are used in combination or have been treated to control their release and enhance shelf life stability. Also, the physiological cooling agents may be added individually or as part of a cooling flavor composition, or used in chewing gum coatings.

In recent years, efforts have been devoted to controlling release characteristics of various ingredients in chewing gum. Efforts have been directed at perfecting the use of high-intensity sweeteners within the chewing gum formulation, to thereby increase the shelf-life stability of the ingredients, i.e., the protection against degradation of the high-potency sweetener over time.

Patent Cooperation Treaty Publication No. 89-03170 discloses a method of controlling the release of acesulfame K. In this process, the sweetener is encapsulated fully or partially to modify the release rate in chewing gum.

Other patent publications disclose how a sweetener like aspartame can be physically modified to control its release rate in chewing gum.

For example, U.S. Pat. No. 4,597,970 to Sharma et al. teaches a process for producing an agglomerated sweetener wherein the sweetener is dispersed in a hydrophobic matrix consisting essentially of lecithin, a glyceride and a fatty acid or wax having a melting point between 25 and 100° C. The disclosed method uses a spray congealing step to form the sweetener-containing matrix into droplets, followed by a fluid-bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground and the particles are then coated with a water-impermeable substance.

U.S. Pat. No. 4,230,687 to Sair et al. teaches a process for encasing an active ingredient to achieve gradual release of the ingredient in a product such as chewing gum. The described method involves adding the ingredient to an encapsulating material in the form of a viscous paste. High shear mixing is used to achieve a homogeneous dispersion of the ingredient within the matrix, which is subsequently dried and ground.

U.S. Pat. No. 4,139,639 to Bahoshy et al. teaches a process of "fixing" aspartame by co-drying (by spray drying or fluid bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents using various encapsulation techniques, such as spray drying, in order to increase the shelf stability of the aspartame.

U.S. Pat. No. 4,634,593 to Stroz et al. teaches a method for producing controlled release sweeteners for confections, such as chewing gum. The method taught therein involves the use of an insoluble fat material which is mix mulled with the sweetener.

Several known compounds have what can be characterized as a "cooling" activity, and are referred to in the art as "physiological cooling agents." Physiological cooling agents are perceived as cold or cool when contacted with the human body and, in particular, with the mucous membranes of the mouth, nose and throat.

Efforts have been directed at perfecting the use of physiological cooling agents within chewing gum formulations to enhance flavor composition and control their release to enhance the flavor of chewing gum.

U.S. Pat. No. 5,326,574 discloses a process for codrying the physiological cooling agent 3-I-menthoxypropane-1,2-diol with a food acceptable, water-soluble carrier and mixing the resulting product into chewing gum.

Peppermint oil is currently used to create a "cooling" in oral products such as toothpaste, mouthwash, chewing gum, candy and other food products. Peppermint oil generally comprises about 45% menthol, about 20% menthone, about 5% menthyl acetate, about 5% eucalyptol and many other constituents. Peppermint oil is even used in non-peppermint products, such as spearmint or wintergreen flavored products, in order to create this desired cooling effect. However, peppermint notes are then found in the resulting non-peppermint flavored products.

Menthol is also known for its physiological cooling effect on the skin and mucous membranes of the mouth. Being a major constituent of peppermint oil, menthol has been used extensively in foods, beverages, dentrifices, mouthwashes, toiletries, lotions and the like. The disadvantages of using menthol, however, are its strong minty odor and the harsh notes it imparts to compositions in which it is found.

A need, therefore, exists for a cooling flavor composition that will contribute a long-lasting cooling sensation to products in which it is found without the unwanted harshness or flavor characteristics that come from adding menthol.

It would be desirable to provide a high flavor impact chewing gum that does not manifest the harsh notes normally associated with some chewing gum. It would also be desirable to provide a clean, high-quality flavor chewing gum with a good cooling effect.

The present invention also relates to a coated chewing gum. Chewing gums are frequently covered with hard or soft coatings. The coatings provide an opportunity for the manufacturer to vary the taste, appearance, mouth-feel and nutritional value of the chewing gum.

For example, some consumers prefer a burst of intense flavor over the slow, gentle flavor release normally associated with chewing gum. In order to provide a favorable flavor impact, gum manufacturers have added flavors to the coating of a coated chewing gum. These flavors include spearmint flavor, peppermint flavor, wintergreen flavor and fruit flavors. In addition, very strong flavors such as menthol have often been used to provide a burst of flavor. However, at concentrations effective to provide a burst of flavor, menthol or mint flavors also manifest a bitter, harsh, burning taste (hereinafter "harsh notes").

The harsh notes are particularly acute with sugarless gum. In the case of coated gum with sugar, the sugar masks many of the harsh notes of menthol and mint flavors (although high levels of menthol or mint flavors can still manifest the harsh notes). However, recent efforts to produce sugarless coated gums have highlighted the difficulties of providing an initial burst of flavor without the harsh notes associated with traditional flavoring.

One method to alleviate the problem of harsh notes in sugarless coated chewing gum is the use of xylitol as a coating material. Xylitol has a sweetness level equivalent to sugar, and produces a cooling effect due to its endothermic heat of solvation. It produces a clean, high-quality flavor with a good cooling effect, particularly when it is used with menthol and mint flavors.

Coating with xylitol is described in U.S. Pat. No. 4,105, 801; U.S. Pat. No. 4,127,677; U.S. Pat. No. 4,681,766; U.S. Pat. No. 4,786,511; and U.S. Pat. No. 4,828,845.

The disadvantage of xylitol is that it is an expensive ingredient. Many efforts have been made to replace xylitol with a less expensive sugarless polyol. The most common and lowest cost polyol used in chewing gum is sorbitol. However, panning with sorbitol has been very difficult since it is hygroscopic and does not readily crystallize.

A number of patents have been published that use various procedures to coat with sorbitol, including G.B. Patent No. 2,115,672; U.S. Pat. No. 4,317,838; and U.S. Pat. No. 4,753,790. A successful sorbitol hard coating was reported in U.S. Pat. No. 4,423,086, particularly when the sorbitol was at least 99% D-sorbitol. However, the quality of coating never approached the quality of typical xylitol coatings.

Other coating patents that teach alternative polyols to xylitol include: U.S. Pat. No. 4,840,797, which discloses a maltitol coating which required over 95% maltitol to obtain a good quality coating on pellet gum; U.S. Pat. Nos. 5,248, 508 and 4,792,453, which disclose a hydrogenated isomaltulose coating; and U.S. Pat. No. 5,603,970, which discloses an erythritol coating.

Still other patents teach partially replacing the xylitol with sorbitol, lactitol, or maltitol. However, these cannot be applied in the same solution, but must be applied by alternating solutions. In other words, a solution of one polyol is applied, then another solution of another polyol is applied. These patents include: U.S. Pat. No. 5,270,061; U.S. Pat. No. 5,376,389; PCT Application Nos. PCT/US93/09354 (published as WO95/08925); PCT/US94/10406 (published as WO95/07625); and PCT/US93/08730 (published as WO95/07622).

A booklet entitled "The Evaluation of Chewing Gum—Xylitol and the Prevention of Dental Caries" published in 1985 by Xyrofin describes a coating formed by panning with a solution containing xylitol and up to 10% sorbitol. U.S. Pat. No. 5,536,511 discloses a coating that comprises cocrystallized xylitol and erythritol. In an approach different from panning from a solution, U.S. Pat. No. 4,146,653 discloses a molten blend of xylitol and sorbitol that are used to form a coating.

U.S. Pat. No. 5,409,715 discloses coating chewing gum with various materials, including waxes, lipids, fatty acids, fats, oils, cellulose derivatives, modified starch, dextrin, gelatin, zein, vegetable gums, proteins, edible polymers, edible plastic film, maltodextrins, polyols, low calorie carbohydrate bulking agents, shellac and combinations thereof.

It would be desirable to provide a high flavor impact chewing gum coating that does not manifest the harsh notes normally associated with such coatings. It would also be desirable to provide a clean, high-quality flavor coated chewing gum with a good cooling effect, while reducing or eliminating the xylitol currently preferred in sugarless coatings.

SUMMARY OF THE INVENTION

This invention incorporates a physiological cooling agent or combination of physiological cooling agents into a chewing gum. One preferred embodiment of the invention provides a chewing gum having a clean, cool sensation imparted by a cooling flavor composition that includes a physiological cooling agent. Another preferred embodiment also contains a flavor, and a combination of physiological cooling agents which have been treated so as to modify their release from the chewing gum. The result is a synergy between the physiological cooling agents and the flavor, which provides a high flavor impact at a lower concentration of flavor. Thus, with either or both aspects of the present invention, chewing gum can be made with a long lasting cooling sensation without unwanted harshness or flavor characteristics. The gum may have a high flavor impact, as well as a clean, high quality flavor with good cooling effect.

In the first aspect, applicants have discovered that using menthol and menthone in combination with one or more physiological cooling agents provides optimal cooling without unwanted flavor characteristics. Adding the physiological cooling agent provides the chewing gum with an unexpected, high-flavor impact where the harsh notes have been reduced or eliminated. This is particularly valuable for sugarless chewing gum where the harsh notes of the flavor are not masked by sugar.

In this first aspect, the invention is directed to cooling flavor compositions that provide the desired "cooling" sensation but not the unwanted harshness and flavor characteristics. The cooling flavor compositions of the present invention replace some or all of the peppermint oil presently used to create a "cooling." Because the cooling flavor compositions use menthol and menthone, as opposed to peppermint oil, the cooling flavor compositions do not add unwanted peppermint notes.

In addition, the physiological cooling agent provides a cooling sensation similar to that associated with gum made from xylitol. Consequently, a lower cost polyol can be used as a chewing gum material without sacrificing the clean, high-quality, cooling sensation ordinarily associated with xylitol.

In one embodiment, the invention is a cooling flavor composition comprising:
  a) about 40% to about 80% by weight menthol;
  b) about 15% to about 50% by weight menthone; and
  c) about 3% to about 25% by weight of at least one physiological cooling agent selected from the group consisting of menthyl succinate; acyclic carboxamide; menthyl lactate; 3-l-menthoxypropane-1,2-diol; N-substituted p-menthane carboxamide; menthone glycerol ketals and mixtures thereof.

In another embodiment, the invention is an oral composition, such as chewing gum, comprising a flavor and a cooling flavor composition comprising:
  a) about 40% to about 80% by weight menthol;
  b) about 15% to about 50% by weight menthone; and
  c) about 3% to about 25% by weight of at least one physiological cooling agent selected from the group consisting of menthyl succinate; acyclic carboxamide; menthyl lactate; 3-I-menthoxypropane-1,2-diol; N-substituted p-menthane carboxamide; menthone glycerol ketals and mixtures thereof.

In this embodiment, the cooling flavor compositions are used in chewing gum to improve the "cool" sensation perceived upon chewing the gum and to extend the duration of the "cool" sensation.

In other embodiments of the invention, the cooling flavor compositions may also be used in other comestibles or even topical products such as creams and lotions.

In a second aspect, the present invention also includes a method for producing chewing gum with an acyclic carboxamide physiological cooling agent or combinations of physiological cooling agents, treated to have a modified-release. The controlled release combination of physiological cooling agents is obtained by modifying the cooling agents by encapsulation, partial encapsulation or partial coating, entrapment or absorption with water-soluble materials or water-insoluble materials. The procedures for modifying the physiological cooling agents include spray drying, spray chilling, fluid-bed coating, coacervation, extrusion, and other agglomerating and standard encapsulating techniques. The cooling agents may also be absorbed onto an inert or water-insoluble material. The cooling agents may be modified in a multiple step process comprising any of the processes noted.

The combination of cooling agents, or the combination of cooling agents when modified according to the present invention, give a chewing gum a controlled-release cooling agent. A higher quantity of cooling agents can be used without resulting in a high initial cooling agent impact, but instead having a delayed cooling release in chewing gum, giving a highly consumer-acceptable chewing gum product. Some cooling agents have a very slow release, but may be modified to give a fast release for more initial impact.

Another embodiment of this invention incorporates a physiological cooling agent into the coating of a coated chewing gum. One preferred embodiment of the invention provides a chewing gum coating having a clean, cool sensation in which xylitol is replaced, in part or in whole, by a less expensive coating material.

Another preferred embodiment also contains a flavor, where the synergy between the physiological cooling agent and the flavor provides a high flavor impact at a lower concentration of flavor. Adding the physiological cooling agent provides the coated chewing gum with an unexpected, high-flavor impact where the harsh notes have been reduced or eliminated. This is particularly valuable for sugarless chewing gum where the harsh notes of the flavor are not masked by sugar.

In addition, the physiological cooling agent provides a cooling sensation similar to that associated with coatings made from xylitol. Consequently, a lower cost polyol can be used as a chewing gum coating material without sacrificing the clean, high-quality, cooling sensation ordinarily associated with xylitol coatings.

In yet another aspect of the invention, a chewing gum composition comprises an acyclic carboxamide physiological cooling agent and either menthol or another physiological cooling agent, or both.

In still another embodiment, a chewing gum composition comprises a hot flavor, such as cinnamon, and a physiological cooling agent. This embodiment produces a breath freshness perception.

The foregoing and other features and advantages of the present invention will become apparent from the following detailed description of the presently preferred embodiments, when read in conjunction with the accompanying examples.

Figure 1:
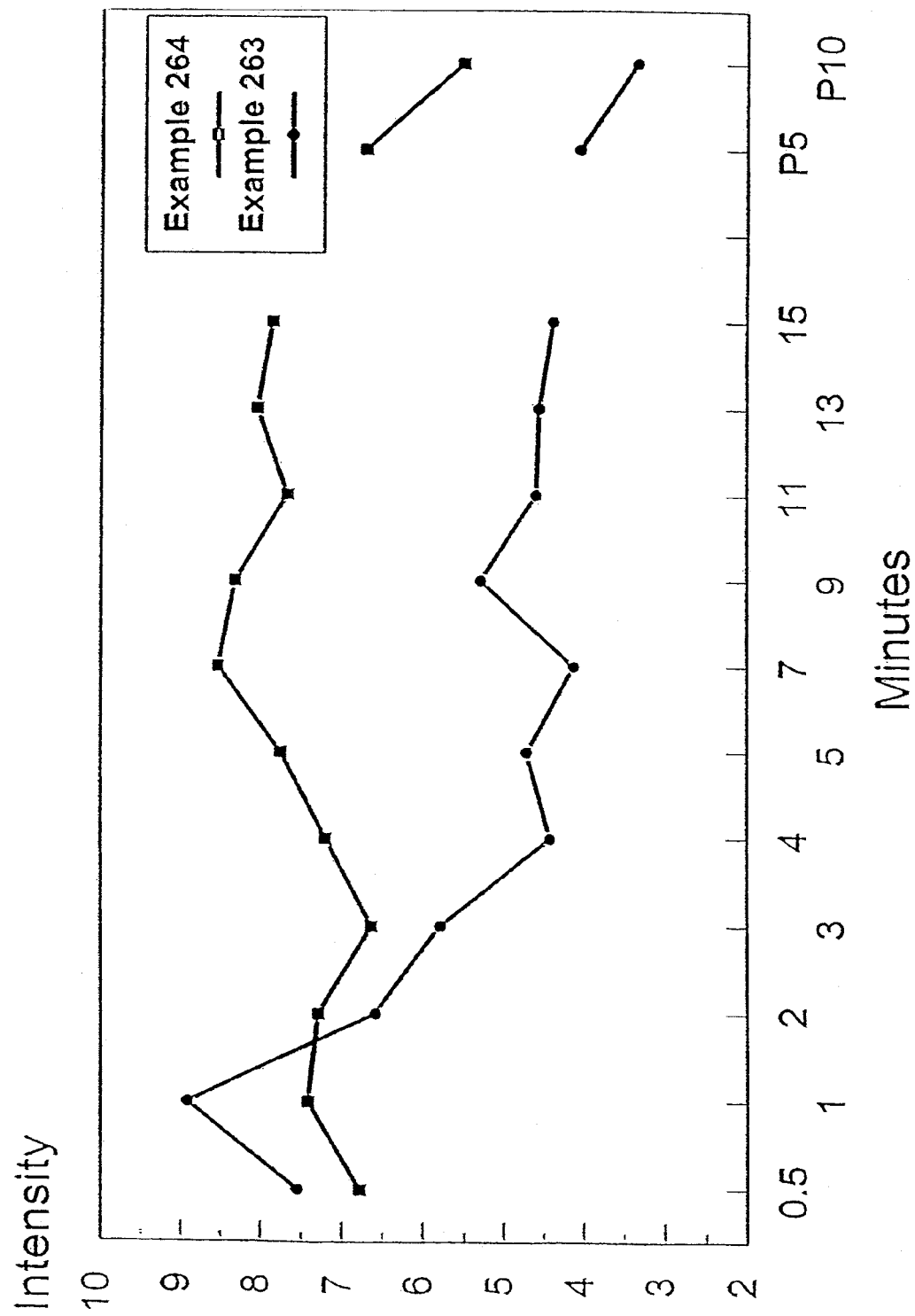
FIG. 1 is a graph showing a rating of perception of fresh breath over time after chewing comparative and inventive gum samples.

DETAILED DESCRIPTION OF THE
PRESENTLY PREFERRED EMBODIMENTS OF
THE INVENTION

In the context of this invention, chewing gum refers to chewing gum, bubble gum and the like. Moreover, all percentages are based on weight percentages unless otherwise specified. Further, although some terms are referred to in the singular, it is understood that such references may also encompass the plural. For example, although chewing gum coating is referred to in the singular, it is understood that coated chewing gum normally contains multiple layers of coating. Therefore a phrase that refers to "the coating," refers to one or more layers of coating. Finally, all references cited herein are incorporated by reference.

The composition of a chewing gum tends to suppress the release of its flavors. Although a slow flavor release is desirable in many instances, some consumers prefer a burst of intense flavor. One method to provide a chewing gum with a greater flavor impact is the addition of encapsulated flavor to a chewing gum. For example, for a cool and refreshing taste, cooling flavors such as encapsulated menthol and/or mint flavors are added to chewing gum. A menthol/mint combination is disclosed in U.S. Pat. No. 4,724,151.

However, the improved flavor impact of adding cooling flavors to the chewing gum is somewhat offset by the disadvantage of the bitter, harsh, burning sensations associated with high concentrations of such flavors. This disadvantage is particularly acute for sugarless gum, since sugar tends to mask the harsh notes.

The inventors have found that adding a combination of physiological cooling agents or a combination of cooling agents that have a modified release from the chewing gum provides a favorable flavor impact. As a result, the inventors are able to reduce or eliminate the harsh notes associated with the prior art high flavor-impact chewing gums, even in the case of sugarless chewing gums.

By adding a combination of physiological cooling agents to a menthol or mint type flavored chewing gum, one can obtain a strong cooling and clean minty flavor, without the higher concentrations of menthol or mint flavors required in the prior art. Also, the fast release encapsulation of a combination of physiological cooling agents complement the mint flavors to give a high impact of flavor and cooling normally found in chewing gum. This cooling effect is like menthol cooling, but without the bitterness associated with menthol.

For sugarless gums, chewing gums containing xylitol have become very popular because xylitol has about the same sweetness level as sugar and a cooling ability due to its endothermic heat of solvation. With this sweetness, xylitol masks the harsh notes of high impact flavors such as menthol and mint flavors. At the same time, its cooling effect complements the cooling effect of the cooling flavors. As a result, xylitol provides a clean, high-quality cooling effect. Xylitol in combination with physiological cooling agents give chewing gum a high quality flavor profile with good cooling. However, because of its expense, various efforts have been made to replace xylitol in coatings with a less expensive ingredient, such as another polyol.

Another method to provide a chewing gum with a greater flavor impact is the addition of flavor to the coating of a coated chewing gum. For example, for a cool and refreshing taste, cooling flavors such as menthol and/or mint flavors are added to the coating of chewing gum.

However, the improved flavor impact of adding cooling flavors to the chewing gum coating is somewhat offset by the disadvantage of the bitter, harsh, burning sensations associated with high concentrations of such flavors. This disadvantage is particularly acute for sugarless gum, since sugar tends to mask the harsh notes.

The inventors have found that adding a physiological cooling agent to the coating provides a favorable flavor impact. As a result, the inventors are able to reduce or eliminate the harsh notes associated with the prior art high flavor-impact coated chewing gums, even in the case of sugarless, coated chewing gums.

By adding a physiological cooling agent to a menthol or mint type flavored chewing gum coating, one can obtain a strong cooling and clean minty flavor, without the higher concentrations of menthol or mint flavors required in prior art coatings. Also, the physiological cooling agents complement the mint flavors to give a high impact of flavor and cooling normally found in coated chewing gum. This cooling effect is like menthol cooling, but without the bitterness associated with menthol.

Coated chewing gums of the present invention may be made with a variety of chewing gum compositions. The chewing gum is prepared as conventional chewing gum, but formed into pellets or balls. The pellets/balls can then be coated by a variety of methods known in the art, such as conventional panning methods to coat chewing gum. The coating is generally applied in multiple layers, where the composition of one layer is not necessarily the composition of the other layers.

The coating of the present invention contains at least a coating material and a physiological cooling agent. It may also contain other ingredients such as flavors, artificial sweeteners and dispersing agents, coloring agents, film formers and binding agents.

Coating material constitutes the substantial portion of the chewing gum coating. Examples of coating material include sugars such as sucrose, maltose, dextrose and glucose syrup; polyols such as maltitol, lactitol, xylitol, mannitol, erythritol, sorbitol, hydrogenated isomaltulose and hydrogenated starch hydrolysates; and combinations thereof.

For sugarless gums, xylitol coatings have become very popular because xylitol has about the same sweetness level as sugar and a cooling ability due to its endothermic heat of solvation. With this sweetness, xylitol masks the harsh notes of high impact flavors such as menthol and mint flavors. At the same time, its cooling effect complements the cooling effect of the cooling flavors. As a result, xylitol provides a clean, high-quality cooling effect. When used with physiological cooling agents, a synergistic cooling effect may be noted with xylitol. However, because of its expense, various efforts have been made to replace xylitol in coatings with a less expensive ingredient, such as another polyol.

One problem with polyol substitutes for xylitol is that they are generally much less sweet than xylitol or sugar. In the presence of high levels of flavor, the polyol substitutes generally provide a coated product with a bitter, unpleasant taste. To some degree, high intensity sweeteners may be used to counteract bitterness, but these also may have some objectionable taste. Also, some of these polyols themselves may contribute to a bitter taste.

By using physiological cooling agents in a coating that comprises polyols other than xylitol, the coating manifests a cooling similar to xylitol cooling. Thus xylitol substitutes, which cost significantly less than xylitol, can be used to coat gum and give a taste sensation similar to xylitol.

Many of the coating material references cited above contemplate the addition of one or more flavors to chewing gum coating. However, none disclose the addition of a physiological cooling agent to give the coating a cooling sensation like that of xylitol.

By using a combination of physiological cooling agents treated to have a modified release in a chewing gum that comprises polyols other than xylitol, the effect is a cooling similar to xylitol cooling. Thus xylitol substitutes, which cost significantly less than xylitol, can be used in gum and give a taste sensation similar to xylitol.

Physiological cooling agents encompasses any number of physiological cooling agents. However, in the context of this invention, the term "physiological cooling agent" does not include traditional flavor-derivatives such as menthol or menthone. Preferred physiological cooling agents do not have a perceptible flavor of their own, but simply provide a cooling effect.

Since the physiological cooling agents do not have their own perceptible flavor, they can be used with other types of flavors to offer new and unique advantages, such as breath freshening. Most confectionery products which are promoted for breath freshening are mint flavored products which contain moderate to high levels of menthol. Menthol is a component of peppermint oil which has a cooling property which provides to the consumer a perception of freshness in the oral cavity.

Paradoxically, some cinnamon flavored products have also been marketed for breath freshening based on the physiological heating provided by cinnamic aldehyde and other spice flavor components. In some cases, menthol or peppermint oil has been added to cinnamon flavored products to provide a cooling sensation and enhance breath freshening. While some consumers enjoy the presence of a mint note in cinnamon confections, others describe the flavor as "muddy", "dirty" and "confused", preferring a "pure" cinnamon flavor.

Another embodiment of the present invention is a confectionery product, preferably a chewing gum, which incorporates a spicy hot flavor, is substantially free of menthol and other mint oil components and which comprises a physiological cooling agent which imparts improved breath freshening and a desirable hot/cold sensory perception without a mint flavor.

It has surprisingly been found that many consumers, who may not appreciate the addition of mint flavor to cinnamon flavored candies and chewing gums, do enjoy the addition of a non-menthol, physiological cooling agent in such products. Furthermore, it has been found that the inventive products have greatly enhanced breath freshening properties compared to cinnamon flavored confections without physiological cooling agents.

The confectionery products of this embodiment of the invention can be any new or existing type of product in that category. Hard candies, hard or soft pan coated items, chewy confections and powdered candies are specifically contemplated. Chewing gum is a preferred embodiment.

The confections of this embodiment of the invention will include a natural or non-menthol hot spice flavor such as cinnamon, clove, ginger, black pepper, cayenne pepper and mixtures of these. Cinnamon flavor is preferred. The flavor composition will be substantially free of menthol and mint oils. By substantially free, it is meant that the flavor composition will comprise less than about 15% and preferably less than 10% of mint components. Most preferably, the flavor composition will have 0% to 3% of mint components. The flavor composition will also contain a physiological cooling agent in an amount sufficient to impart noticeable cooling to the product.

While there are references that disclose the use of physiological cooling agents in chewing gum and other confections, unique combinations and controlled release are new areas of interest. Also, no references disclose the use of physiological cooling agents in a chewing gum coating. Because a flavor imparts a distinct and unique sensation when it is used in a chewing gum, some combinations of the physiological cooling agents offer unique advantages and may be combined with various types of flavors or with various methods of encapsulation and entrapment for controlled release.

Several U.S. and foreign references disclose specific compounds and classes of compounds that are physiological cooling agents that may be used in the present invention. Some of these disclose the use of physiological cooling agents in chewing gum. These include:

U.S. Pat. No. 5,451,404 (a ketal combined with another coolant (menthol or carboxamides));

U.S. Pat. No. 5,372,824 (physiological cooling agents and reduced menthol);

U.S. Pat. No. 5,348,750 (menthone ketals);

U.S. Pat. No. 5,326,574 (a spray dried 3-I-menthoxypropane-1,2-diol);

U.S. Pat. No. 5,266,592 (menthone glycerol ketals);

U.S. Pat. No. 5,165,943 (a cyclodextrin complex with physiological cooling agents);

U.S. Pat. No. 5,009,893 (p-menthane carboxamide physiological cooling agent with menthol for reduced bitterness);

U.S. Pat. No. 4,459,425 (3-I-menthoxypropane-1,2-diol);

U.S. Pat. No. 4,296,093 (substituted cyclohexanamides);

U.S. Pat. Nos. 4,248,859 and 4,318,900 (alkyl substituted alicyclic carboxylic acids, esters or amides);

U.S. Pat. Nos. 4,157,384 and 4,029,759 (various 3-substituted p-menthanes);

U.S. Pat. No. 4,081,480 (alpha-oxy(oxo)mercaptan alkanes);

U.S. Pat. No. 4,070,449 (sulphoxides and sulphones);

U.S. Pat. Nos. 4,060,091; 4,190,643 and 4,136,163 (substituted p-menthane-3-carboxamides);

U.S. Pat. Nos. 4,153,679; 4,296,255 and 4,230,688 (acyclic carboxamides);

U.S. Pat. No. 4,034,109 (acyclic sulphonamides and sulphinamides);

U.S. Pat. No. 4,033,994 (p-menthane-3-carboxylates);

U.S. Pat. Nos. 3,793,446 and 3,644,613 (ketoesters of menthol);

U.S. Pat. No. 3,720,762 (spilanthol with menthol or peppermint oil);

Canadian Patent No. 2,101,790 (carbonic acids having free polar groups);

German Patent No. 2,608,226 (menthyl lactate);

German Patent No. 2,433,165 (N-acetylglycine menthyl ester);

French Patent No. 2,577,922 (L-menthyl-3-hydroxybutyrate);

Japanese Patent No. 94/065023 (2-isopropenyl-5-methylcyclohexanol);

Great Britain Patent No. 1,502,680 (bicyclic acids, esters, amides and substituted menthanols);

Great Britain Patent No. 1,476,351 (cyclic and acyclic amides, ureas and sulphonamides);

Great Britain Patent No. 1,442,998 (trialkyl-substituted cyclohexane carboxamides);

Great Britain Patents Nos. 1,421,744 and 1,421,743 (novel amides);

Great Britain Patent No. 1,411,786 (cyclohexanamides);

Great Britain Patent No. 1,404,596 (acyclic secondary and tertiary alkanols);

PCT Publication No. WO 97/07771 (menthyl succinate and carboxamides);

PCT Publication No. WO 96/28133 (coolant composition for comestibles);

PCT Publication No. WO 96/17524 (a cooling composition comprising N-substituted p-menthane carboxamides and menthol);

PCT Publication No. WO 94/010117 (cyclohexanol derivatives); and

U.S. Pat. No. 3,639,569 (physiological cooling agents).

Particular examples of physiological cooling agents include:

1) substituted p-menthanes, substituted p-menthane-carboxamides (e.g., N-ethyl-p-menthane-3-carboxamide (FEMA 3455)), acyclic carboxamides, substituted cyclohexanamides, substituted cyclohexane carboxamides, substituted ureas and sulphonamides, and substituted menthanols (all from Wilkinson Sword);
2) hydroxymethyl and hydroxyethyl derivatives of p-menthane (from Lever Bros.);
3) menthyl succinate;
4) 2-mercapto-cyclo-decanone (from International Flavors and Fragrances);
5) 2-isopropanyl-5-methylcyclohexanol (from Hisamitsu Pharmaceuticals, hereinafter "isopregol");
6) hydroxycarboxylic acids with 2-6 carbon atoms;
7) menthone glycerol ketals (FEMA 3807, tradename FRESCOLAT™ type MGA);
8) 3-I-menthoxypropane-1,2-diol (from Takasago, FEMA 3784, (hereinafter "TCA"));
9) menthyl lactate; (from Haarman & Reimer, FEMA 3748, tradename FRESCOLAT™ type ML).

While any of the above-disclosed physiological cooling agents may be used in chewing gum, the presently preferred physiological cooling agents are:

1) substituted p-menthane carboxamides (PMC), such as those disclosed in U.S. Pat. Nos. 4,060,091; 4,190,643 and 4,136,163, all assigned to Wilkinson Sword, especially N-ethyl-p-menthane-3-carboxamide (called WS-3);
2) acyclic carboxamides (AC), such as those disclosed in U.S. Pat. Nos. 4,296,255; 4,230,688; and 4,153,679; all assigned to Wilkinson Sword, especially N-2,3-trimethyl-2-isopropyl butanamide (called WS-23);
3) menthone glycerol ketal (MGK);
4) menthyl lactate (ML);
5) menthyl succinate (MS); and
6) 3-I-menthoxypropane-1,2-diol (TCA).

The concentration of physiological cooling agent will depend on the intensity of the physiological cooling agent and the desired cooling effect. In general the concentration of cooling agents used is between about 0.001% and about 2% by weight of the chewing gum. The preferred concentration of cooling agent is between about 0.01% and about 1.0%, more preferably between 0.02% and about 0.5%.

The present invention contemplates that two or more physiological cooling agents may be added to the flavor used to make the chewing gum. On the other hand, the flavor and cooling agents may be added separately anywhere within the manufacturing process for making a chewing gum product.

These flavors include any flavor which is of food acceptable quality commonly known in the art such as essential oils, synthetic flavors or mixtures thereof. Such flavors include, but are not limited to, oils derived from plants and fruits such as citrus oils, fruit essences, peppermint oil, spearmint oil, eucalyptus, other mint oils, clove oil, oil of wintergreen, cinnamic aldehyde, anise and the like. Flavors that are very strong, such as menthol flavors, are also contemplated in this invention. Preferred flavors include cooling flavors such as peppermint, eucalyptus, menthol, wintergreen and fruity-mint; non-cooling flavors such as spearmint and cinnamon; and combinations thereof.

Artificial flavor components are also contemplated by the present invention. Those of ordinary skill in the art will recognize that natural and artificial flavors may be combined in any sensorially acceptable blend. All such flavors and blends are contemplated by the present invention.

The flavor may be added to the chewing gum formula in an amount such that it will contain from about 0.1% to about 10% flavor, preferably from about 0.2% to about 3.0% flavor, and most preferably about 0.5% to about 2% flavor.

For menthol flavored chewing gum, a combination of physiological cooling agents allows for a reduced overall concentration of menthol. However, it does not completely eliminate menthol, because menthol has a very identifiable unique taste and cooling sensation. Hence, in the case of menthol flavor, the physiological cooling agents only enhance the cooling while reducing the menthol bitterness.

The present invention thus is also directed to novel cooling flavor compositions comprising menthol and menthone that contribute a long-lasting cool sensation. These cooling flavor compositions may be substituted for peppermint oil in non-peppermint products, resulting in added coolness without harshness or unwanted flavor characteristics. They can, of course, also be used in peppermint flavored products.

It has been discovered that menthol, when used in conjunction with menthone, provides a cool sensation without the characteristically harsh tones of menthol. It has been further discovered that the use of menthol and menthone in combination with a physiological cooling agent results in a cooling flavor composition that provides initial optimal cooling, as well as extended coolness. The presence of only one of these components will not provide the desired results.

Menthol, which occurs naturally in peppermint oil, is the agent that provides the "cooling" sensation, but menthol alone tends to distort flavor notes. When used in conjunction with menthone, however, the result is cooling without harshness because the menthone helps to curb the harsh qualities of the menthol.

In one embodiment of the present invention, menthol and menthone are used in conjunction with one or more physiological cooling agents to produce a cooling flavor composition yielding optimal coolness. The menthol and menthone are used in their separated, or pure, form, as distinguished from being present in peppermint oil. Used as such, the menthol and menthone supply a fast release of the "cooling" sensation but do not add a peppermint flavor. These cooling flavor compositions, which have a physiological cooling effect, can be used in food, drinks, dentrifices, gargles, cosmetics, lotions, etc. Suitable physiological cooling agents that are preferred in this aspect of the invention are menthyl succinate; menthyl lactate; 3-l-menthoxypropane-1,2-diol; menthone glycerol ketals; N-substituted p-menthane carboxamide; acyclic carboxamide and mixtures thereof. The preferred cooling agents are menthyl succinate, N-substituted p-menthane carboxamide (WS-3), acyclic carboxamide (WS-23) and menthyl lactate.

The cooling flavor composition comprising menthol, menthone and one or more physiological cooling agents is more potent than peppermint oil alone. As a result, less of the cooling blend is needed to achieve the desired coolness than peppermint oil. This would decrease the need for peppermint oil, a costly commodity which has an uncertain supply, saving money and conserving peppermint oil. However, if desired, peppermint oil may be added in addition to the cooling flavor compositions of the present invention.

In another embodiment, the cooling flavor composition comprising menthol, menthone and one or more physiological cooling agents is used in oral compositions such as chewing gum. The result is oral compositions having optimal cooling without harsh tones or unwanted flavor characteristics. Moreover, the blend of menthol, menthone and one or more synthetic cooling agents extends the coolness of the oral compositions in which the blend is used. This novel blend supplies a fast release of the cooling sensation from the menthol and menthone, and an extended release from the physiological cooling agents.

Because the cooling flavor compositions of the present invention will not impart an unwanted peppermint flavor to non-peppermint products, these compositions may be used to add coolness to fruit and other flavors.

Physiological cooling agents generally release slowly from chewing gum during the early stages of mastication of the gum because of their low solubility in water. However, some like TCA are moderately fast release, others like WS-3, WS-23 are moderately slow release, and others like menthone glycerol ketal, menthyl lactate and menthyl succinate are very slow release.

Combinations of cooling agents may not only be synergistic but may also provide both moderate release and slow release to give flavor impact and flavor extension. Physical modifications of the physiological cooling agents by encapsulation with another substrate will also modify their release in chewing gum by modifying the solubility or dissolution rate. Any standard technique which gives partial or full encapsulation of the combination of physiological cooling agents can be used. These techniques include, but are not limited to, spray drying, spray chilling, fluid-bed coating, and coacervation. These encapsulation techniques that give partial encapsulation or full encapsulation can be used individually or in any combination in a single step process or multiple step process. Generally, a modified release of physiological cooling agents is obtained in multistep processes like spray drying the combined physiological cooling agents and then fluid-bed coating the resultant powder.

The encapsulation techniques here described are standard coating techniques and generally give varying degrees of coating from partial to full coating, depending on the coating composition used in the process. Also, the coating compositions may be susceptible to water permeation to various degrees. Generally, compositions that have high organic solubility, good film forming properties and low water solubility give better delayed release of the physiological cooling agents. Such compositions include acrylic polymers and copolymers, carboxyvinyl polymer, polyamides, polystyrene, polyvinyl acetate, polyvinyl acetate phthalate, polyvinyl pyrrolidone and waxes. Although all of these materials are possible for encapsulation of physiological cooling agents, only food grade materials should be considered. Two standard food grade coating materials that are good film formers but not water soluble are shellac and Zein. Others which are more water soluble, but good film formers, are materials like agar, alginates, a wide range of cellulose derivative like ethyl cellulose and hydroxypropylmethyl cellulose, dextrin, gelatin and modified starches. These ingredients, which are generally approved for food use, may give a faster release when used as an encapsulant for the physiological cooling agents. Other encapsulants like acacia or maltodextrin can also encapsulate the physiological cooling agents, but give a faster release rate of the physiological cooling agents.

The amount of coating or encapsulating material on the cooling agents also controls the length of time for their release from chewing gum. Generally, the higher the level of coating and the lower the amount of active cooling agents, the slower the release of the cooling agents during mastication. To obtain the desired cooling agent release to blend with a gum's flavor release, the encapsulant should be a minimum of about 20% of the coated cooling agents. Preferably, the encapsulant should be a minimum of about 30% of the coated cooling agents, and most preferably should be a minimum of about 40% of the coated cooling agents. Depending on the coating material, a higher or lower amount of coating material may be needed to give the desired release of cooling agents.

Another method of giving a delayed release of the physiological cooling agents is agglomeration with an agglomerating agent which partially coats the cooling agents. This method includes the step of mixing the cooling agents and agglomerating agent with a small amount of water or solvent. The mixture is prepared in such a way as to have individual wet particles in contact with each other so a partial coating can be applied. After the water or solvent is removed, the mixture is ground and used as a powdered coated cooling agent.

Materials that can be used as the agglomerating agent are the same as those used in the encapsulation mentioned previously. However, since the coating is only a partial encapsulation, some agglomeration agents are more effective in delaying release than others. Some of the better agglomerating agents are the organic polymers like acrylic polymer and copolymers, polyvinyl acetate, polyvinyl-pyrrolidone, waxes, shellac and Zein. Other agglomerating agents are not as effective in giving a delayed release as are the polymers, waxes, shellac and Zein, but can be used to give some delayed release. These others agglomerating agents include, but are not limited to, agar, alginates, a wide range of cellulose derivatives, dextrin, gelatin, modified starches, and vegetable gums like guar gums, locust bean gum, and carrageenan. Even though the agglomerated cooling agents are only partially coated, when the quantity of coating is increased compared to the quantity of the cooling agents, the release can be delayed for a longer time during mastication. The level of coating used in the agglomerated product is a minimum of about 5%. Preferably the coating level is a minimum of about 15%, and more preferably about 20%. Depending on the agglomerating agent, a higher or lower amount of agent may be needed to give the desired release of cooling agents.

The physiological cooling agents may be coated in a two-step process or multiple step process. The physiological cooling agents may be encapsulated with any of the materials as described previously and then the encapsulated material can be agglomerated as described previously to obtain an encapsulated/agglomerated product that could be used in chewing gum to give a delayed release.

In another embodiment of this invention, the physiological cooling agents may be absorbed onto another component, often referred to as a carrier, which is porous and become entrapped in the matrix of the porous component. Common materials used for absorbing the physiological cooling agents include, but are not limited to, silicas, silicates, pharmasorb clay, sponge-like beads or microbeads, amorphous carbonates and hydroxides, including aluminum and calcium lakes, vegetable gums and other spray dried materials.

Depending on the type of absorbent material and how it is prepared, the amount of the physiological cooling agents that can be loaded onto the absorbent will vary. Generally materials like polymers or spongelike beads or microbeads, amorphous sugars, and alditols and amorphous carbonates and hydroxides absorb about 10% to about 40% of the weight of the absorbent. Other materials like silicas and pharmasorb clays may be able to absorb about 20% to about 80% of the weight of the absorbent.

The general procedure for absorbing the physiological cooling agents onto the absorbent is as follows. An absorbent like fumed silica powder can be mixed in a powder blender and a solution of the physiological cooling agents can be sprayed onto the powder as mixing continues. The solution can be about 5% to 30% cooling agent, and higher levels may be used if higher temperatures are used. Generally water is the solvent, but other solvents like alcohol should also be used if approved for use in food. As the powder mixes, the liquid is sprayed onto the powder. Spraying is stopped before the mix becomes damp. The still flowing powder is removed from the mixer and dried to remove the water or other solvent, and ground to a specific particle size.

After the physiological cooling agents are absorbed onto an absorbent or fixed onto an absorbent, the fixative/cooling agents can be coated by encapsulation. Either full or partial encapsulation may be used, depending on the coating composition used in the process. Full encapsulation may be obtained by coating with a polymer as in spray drying, spray chilling, fluid-bed coating, extrusion, coacervation, or any other standard technique. A partial encapsulation or coating can be obtained by agglomeration of the fixative/cooling agents mixture using any of the materials discussed above.

The physiological cooling agents can be treated to modify their release by being entrapped in an extrusion process. Examples of such extrusion processes are disclosed in U.S. Pat. No. 5,128,155 and PCT Publication No. WO 94/06308.

The four methods to use to obtain a modified release of physiological cooling agents are (1) encapsulation by spray drying, fluid-bed coating, spray chilling and coacervation to give full or partial encapsulation; (2) agglomeration to give partial encapsulation; (3) fixation or absorption which also gives partial encapsulation; and (4) entrapment by extrusion. These four methods, combined in any usable manner which physically isolates the physiological cooling agents, modifies their dissolvability or modifies the release of physiological cooling agents are included in this invention.

The previously described cooling flavor compositions and encapsulated, agglomerated or absorbed physiological cooling agents may readily be incorporated into a chewing gum composition. Generally the physiological cooling agents will be added to the gum in either the form of a cooling flavor composition or as part of a modified release combination of physiological cooling agents. However, both of these aspects of the invention may be used in the same gum formula, and the cooling flavor composition itself or its individual components may be treated to have a modified release. The remainder of the chewing gum ingredients are noncritical to the present invention. That is, the cooling flavor composition and/or coated particles of physiological cooling agents can be incorporated into conventional chewing gum formulations in a conventional manner. Naturally, the preferred chewing gum formulation is a sugarless formulation. However, the physiological cooling agents may also be used in a sugar chewing gum. The cooling flavor composition and coated physiological cooling agents may be used in either regular chewing gum or bubble gum.

In other embodiments of this invention, particularly coatings of chewing gum, the concentration of physiological cooling agent will depend on the intensity of the physiological cooling agent and the desired cooling effect. In general the concentration of cooling agents used is between about 0.001% and about 1% by weight of coating. The preferred concentration of cooling agent is between about 0.01% and about 0.5%, more preferably between about 0.02% and about 0.2%.

The present invention contemplates that one or more flavors may be added to the syrup used to make the coating, or applied to the gum center while the syrup coating is drying, or after the coating has dried. Furthermore, the flavor may be applied anywhere within the sequence of coats, for example, after the third, twelfth, eighteenth, etc., coats.

These flavors include any flavor which is of food acceptable quality, including the flavors described earlier for use in chewing gum. The flavor may be added to the coating syrup in an amount such that the coating will contain from about 0.2% to about 1.2% flavor and preferably from about 0.7% to about 1.0% flavor.

For menthol flavored coatings, this concentration of physiological cooling agent allows a reduced overall concentration of menthol. However, it does not completely eliminate menthol, because menthol has a very identifiable unique taste and cooling sensation. Hence, in the case of menthol flavor, the physiological cooling agents only enhance the cooling while reducing the menthol bitterness.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05% to about 0.3%, and preferably from about 0.10% to about 0.15% artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1% to about 1.0%, and preferably from about 0.3% to about 0.6% of the agent.

Coloring agents are preferably added directly to the syrup in the dye or lake form. Coloring agents contemplated by the present invention include food quality dyes. Film formers preferably added to the syrup include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, alginate, cellulosics, vegetable gums and the like.

Conventional panning procedures generally use sucrose as the coating material, but recent advances in panning have allowed the use of other carbohydrate materials to be used in the place of sucrose. Some of these components include, but are not limited to, dextrose, maltose, erythritol, xylitol, hydrogenated isomaltulose, maltitol and other new polyols or a combination thereof.

The coating material may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Antitack agents may also be added as panning modifiers, which allow the use of a variety of carbohydrates and sugar alcohols to be used in the development of new panned or coated gum products.

The chewing gum center of the present invention follows the general pattern outlined below. These centers may contain physiological cooling agents as an ingredient.

In general, a chewing gum center composition or other chewing gum compositions typically contain a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laureate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

According to the preferred embodiment of the present invention, the insoluble gum base constitutes between about 5% to about 95% by weight of the gum. More preferably the insoluble gum base comprises between 10% and 50% by weight of the gum and most preferably about 20% to 35% by weight of the gum.

The gum base typically also includes a filler component. The filler component may be calcium carbonate, magnesium carbonate, talc, dicalcium phosphate or the like. The filler may constitute between about 5% and about 60% by weight of the gum base. Preferably the filler comprises about 5% to 50% by weight of the gum base.

Gum bases typically also contain softeners including glycerol monostearate and glycerol triacetate. Gum bases may also contain optional ingredients such as antioxidants, colors, and emulsifiers. The present invention contemplates employing any commercially acceptable gum base.

The water-soluble portion of the chewing gum may further comprise softeners, sweeteners, flavors, physiological cooling agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the cooling flavor compositions or coated physiological cooling agents of the present invention will most likely be used in sugarless gum formulations. However, formulations containing sugar are also within the scope of the invention. Sugar sweeteners generally include saccharide-containing components commonly known in the chewing gum art which comprise, but are not limited to, sucrose, dextrose, maltose, dextrin, dried invert sugar, fructose, galactose, corn syrup solids and the like, alone or in any combination.

The cooling flavor compositions and coated physiological cooling agents of the present invention can also be used in combination with sugarless sweeteners. Generally sugarless sweeteners include components with sweetening characteristics but which are devoid of the commonly known sugars and comprise, but are not limited to, sugar alcohols such as sorbitol, hydrogenated isomaltulose, mannitol, xylitol, lactitol, erythintol, hydrogenated starch hydrolysate, maltitol and the like alone or in any combination.

Depending on the particular sweetness release profile and shelf-stability needed, coated or uncoated high-intensity sweeteners may be used in the chewing gum center or in the coating. High-intensity sweeteners, preferably aspartame, may be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame is preferred when aspartame is used.

Optional ingredients such as colors, emulsifiers and pharmaceutical agents may also be added as separate components of the chewing gum composition, or added as part of the gum base.

Aqueous syrups, such as corn syrup and hydrogenated corn syrup may be used, particularly if their moisture content is reduced. This can preferably be done by coevaporating the aqueous syrup with a plasticizer, such as glycerin or propylene glycol, to a moisture content of less than 10%. Preferred compositions include hydrogenated starch hydrolysate solids and glycerin. Such syrups and their methods of preparation are discussed in detail in U.S. Pat. No. 4,671,967.

A preferred method of manufacturing chewing gum according to the present invention is by sequentially adding the various chewing gum ingredients to any commercially available mixer known in the art. After the ingredients have been thoroughly mixed, the gum is discharged from the mixer and shaped into the desired form such as by rolling into sheets and cutting into sticks, extruding into chunks, or casting into pellets.

Generally, the ingredients are mixed by first melting the gum base and adding it to the running mixer. the base may also be melted in the mixer itself. Color or emulsifiers may also be added at this time, along with syrup and a portion of the bulking agent. Further portions of the bulking agent may then be added to the mixer. A flavoring agent is typically added with the final portion of the bulking agent. The cooling flavor composition of the present invention are preferably added as part of the flavor addition. The coated physiological cooling agents of the present invention are preferably added after the final portion of bulking agent and flavor have been added. The entire mixing procedure typically takes from five to fifteen minutes, but longer mixing times may sometime be required. Those skilled in the art will recognize that many variations of the above described procedures may be followed.

When the physiological cooling agent is used as part of a cooling flavor composition, using menthol and menthone, the cooling flavor composition will contain preferably about 40% to about 80%, and more preferably about 50% to about 70%, menthol, and about 15% to about 50%, and more preferably about 20% to about 40%, menthone. In the preferred cooling flavor composition, the ratio of menthol to menthone is preferably between about 4:5 and about 16:3. The ratio of physiological cooling agents to the total of menthol and menthone is preferable between about 3:97 and about 1:4. Typically this will mean about 3% to about 25%, and more preferably about 4% to about 15% of the cooling composition will be one or more physiological cooling agents. The preferred physiological cooling agents are: menthyl succinate; N-2,3-trimethyl-2-isopropyl butanamide; menthyl lactate; 3-I -menthoxypropane-1,2-diol; N-substituted p-menthane carboxamide; menthone glycerol ketals and mixture thereof.

If another flavor is used in the gum, or other oral composition, beside the cooling flavor composition, the cooling flavor composition outlined above may be mixed with the other flavor. In addition, some components of the cooling flavor composition may be mixed with the other flavor, and some components added separately to the gum. However, it is preferred that any other flavor and the cooling flavor composition be premixed before being added to the gum.

Once formed, the chewing gum center can be coated. The coating is initially present as a liquid syrup which contains from about 30% to about 80% or 85% of the coating ingredients previously described herein, and from about 15% or 20% to about 70% of a solvent such as water. In general, the coating process is carried out in conventional panning equipment. Sugarless gum center tablets to be coated are placed into the panning equipment to form a moving mass.

The material or syrup which will eventually form the coating is applied or distributed over the gum center tablets. Flavors may be added before, during and after applying the syrup to the gum centers. Once the coating has dried to form a hard surface, additional syrup additions can be made to produce a plurality of coatings or multiple layers of coating.

In the panning procedure, syrup is added to the gum center tablets at a temperature range of from about 100° F. to about 240° F. Preferably, the syrup temperature is from about 140° F. to about 200° F. Most preferably, the syrup temperature should be kept constant throughout the process in order to prevent the polyol in the syrup from crystallizing.

The syrup may be mixed with, sprayed upon, poured over, or added to the gum center tablets in any way known to those skilled in the art.

In another embodiment, a soft coating is formed by adding a powder coating after a liquid coating. The powder coating may include natural carbohydrate gum hydrolysates, maltodextrin, gelatin, cellulose derivatives, starches, modified starches, sugars, sugar alcohols, natural carbohydrate gums and fillers like talc and calcium carbonate.

Each component of the coating on the gum center may be applied in a single layer or in a plurality of layers. In general, a plurality of layers is obtained by applying single coats, allowing the layers to dry, and then repeating the process. The amount of solids added by each coating step depends chiefly on the concentration of the coating syrup. Any number of coats may be applied to the gum center Tablet. Preferably, no more than about 75 coats are applied to the gum center. More preferably, less than about 60 coats are applied and most preferably, about 30 to about 60 coats are applied. In any event, the present invention contemplates applying an amount of syrup sufficient to yield a coated chewing gum product containing about 10% to about 65% coating. Preferably, the final product will contain from about 20% to about 50% coating.

Those skilled in the art will recognize that in order to obtain a plurality of coated layers, a plurality of premeasured aliquots of coating syrup may be applied to the gum center. It is contemplated, however, that the volume of aliquots of syrup applied to the gum center may vary throughout the coating procedure.

Once a coating of syrup is applied to the gum center, the present invention contemplates drying the wet syrup in an inert medium. A preferred drying medium comprises air. Preferably, forced drying air contacts the wet syrup coating in a temperature range of from about 70° F. to about 110° F. More preferably, the drying air is in the temperature range of from about 80° F. to about 100° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavor is applied after a syrup coating has been dried, the present invention contemplates drying the flavor with or without the use of a drying medium.

EXAMPLES

The following four ingredients can be mixed with flavors and used in chewing gum formulations. The percentage listed are percentages of the total of these four ingredients. However, the ingredients were not mixed together first, but were added individually to the flavor used in the gum. The four ingredients in combination are referred to herein as cooling blends A, B and C.

|  | A | B | C |
|---|---|---|---|
| Menthol | 52.5 | 60.2 | 62.5 |
| Menthone | 25.8 | 30.6 | 31.2 |

-continued

|  | A | B | C |
|---|---|---|---|
| Menthyl succinate | 14.5 | 6.1 | 4.2 |
| Menthyl lactate | 7.2 | 3.1 | 2.1 |

Examples 1 and 2

Cooling blend A may be mixed with a cherry flavor and used to make two cherry flavored sugarless gum formulas. Both products would have a slightly minty flavor with cherry. When a peppermint flavor is used in place of the cooling blend in comparable formulas, the minty character is too strong. The cooling blend gives a high quality cool cherry mint flavored product as formulated below:

TABLE 1

|  | Example 1 | Example 2 |
|---|---|---|
| Sorbitol | 49.51 | 51.44 |
| Base | 28.50 | 25.00 |
| Glycerin | 12.00 | 12.00 |
| Cherry Flavor | 3.0848 | 2.8848 |
| Cooling Blend A | 0.1152 | 0.1152 |
| Spray Dried Cherry Flavor | 0.30 | — |
| Xylitol | 1.50 | 4.50 |
| Fumeric, Citric, and Adipic Acids | 2.10 | 2.10 |
| Encapsulated Sweeteners | 1.36 | 1.36 |
| Salt Solution | 0.75 | — |
| Color | 0.28 | 0.30 |
| Lecithin | 0.50 | 0.30 |
| TOTAL | 100.00 | 100.00 |

Examples 3, 4 and 5

Cooling blend B may be used in a sugarless wintergreen flavored chewing gum to give improved cooling without mint flavor according to the following formulas:

TABLE 2

|  | Example 3 | Example 4 | Example 5 |
|---|---|---|---|
| Sorbitol | 49.60 | 50.01 | 48.76 |
| Base | 25.10 | 25.10 | 25.10 |
| Glycerin | 14.00 | 6.00 | 14.00 |
| Maltitol | 5.00 | 7.00 | 10.00 |
| Coevaporated Glycerin/Lycasin* | 3.50 | 9.50 | — |
| Wintergreen Flavor | 1.1296 | 1.1296 | 1.1296 |
| Cooling Blend B | 0.4704 | 0.4704 | 0.4704 |
| Encapsulated Wintergreen Flavor | 0.1625 | 0.1625 | — |
| Encapsulated Menthol | 0.0875 | 0.0875 | — |
| Encapsulated Sweeteners | 0.54 | 0.54 | 0.54 |
| Salt Solution** | 0.28 | — | — |
| Color | 0.13 | — | — |
| TOTAL | 100.00 | 100.00 | 100.00 |

*Contains 25% glycerin, 67.5% Lycasin brand hydrogenated starch hydrolsate solids and 7.5% water.
**Contains 10% NaCl and 90% water.

Examples 6 through 10

Cooling blend C was used in spearmint and peppermint flavored chewing gums of Examples 6 through 10 to give improved cooling with mint flavor. The increased cooling yielded products with less bitterness and harshness, and gave good minty tasting products. The following formulas were made:

TABLE 3

|  | Example 6 | Example 7 | Example 8 | Example 9 | Example 10 |
|---|---|---|---|---|---|
| Sorbitol | 47.21 | 48.60 | 32.76 | 48.41 | 40.60 |
| Base | 25.00 | 25.00 | 37.35 | 25.00 | 30.00 |
| Glycerin | 6.00 | 11.40 | 12.00 | 8.00 | 10.00 |
| Coevaporated Glycerin/Lycasin* | 9.50 | 7.67 | — | 9.50 | 3.50 |
| Maltitol$^A$/Mannitol$^B$ | 10.00$^A$ | 5.00$^A$ | 3.07$^B$ | 5.00$^B$ | 7.00$^B$ |
| Spearmint Flavor | 1.0908 | 1.0908 | — | — | — |
| Cooling Blend C | 0.2592 | 0.2592 | 0.7425 | 0.7425 | 0.40 |
| Peppermint Flavor | — | — | 1.5075 | 1.5075 | 1.60 |
| Lecithin | 0.30 | 0.30 | 0.40 | 0.30 | 0.30 |
| Calcium Carbonate | — | — | 9.66 | — | 5.00 |
| Encapsulated Menthol | — | 0.20 | 1.50 | 1.00 | 1.00 |
| Encapsulated Sweetener | 0.54 | 0.34 | 0.34 | 0.54 | 0.60 |
| Salt Solution** | 0.10 | 0.10 | 0.67 | — | — |
| Color | — | 0.04 | — | — | — |
| TOTAL | 100.00 | 100.00 | 100.00 | 100.00 | 100.00 |

*Contains 25% glycerin, 67.5% Lycasin brand hydrogenated starch hydrolsate solids and 7.5% water.
**Contains 10% NaCl and 90% water.

Examples 11 through 17

The following formulations contain combinations of cooling agents that may give fast and slow release and may be synergistic to increase cooling when used in the same formulation:

TABLE 4

SUGARLESS CHEWING GUM

|  | Example 11 | Example 12 | Example 13 | Example 14 |
|---|---|---|---|---|
| Base | 33.10 | 28.00 | 30.00 | 28.00 |
| Calcium Carbonate | — | — | 11.00 | — |
| Sorbitol | 55.90 | 54.36 | 46.08 | 49.52 |
| Glycerin | 8.00 | 5.40 | 0.40 | 8.30 |
| Liquid Sorbitol | — | 6.00 | 6.20 | 2.00 |
| Encapsulated Sweetener | 0.70 | 0.24 | 0.24 | 0.82 |
| Menthol | 1.10 | — | 0.26 | 0.30 |
| Active ML/TCA* | 0.10 | 0.20 | 0.12 | 0.16 |
| Mannitol | — | 3.00 | 3.00 | 8.00 |
| Peppermint Flavor | 1.10 | 2.00 | — | — |
| Methyl Salicylate Flavor | — | — | 1.90 | 1.90 |
| Lecithin | — | 0.80 | 0.80 | 1.00 |
| Encapsulated Menthol/Flavor | — | — | — | — |
| TOTAL | 100.00 | 100.00 | 100.00 | 100.00 |

*50/50 combination of ML and TCA

TABLE 5

SUGARLESS CHEWING GUM

|  | Example 15 | Example 16 | Example 17 |
|---|---|---|---|
| Base | 29.00 | 31.60 | 33.60 |
| Calcium Carbonate | 15.00 | 11.00 | 13.00 |
| Sorbitol | 41.26 | 44.48 | 47.73 |
| Glycerin | 10.00 | 0.80 | 0.75 |
| Liquid Sorbitol | — | 7.20 | — |
| Encapsulated Sweetener | 0.40 | 0.66 | 0.66 |
| Menthol | 0.90 | 0.30 | 0.30 |
| Active ML/MGK* | 0.14 | 0.06 | 0.06 |
| Mannitol | — | — | — |
| Peppermint Flavor | 1.30 | 1.40 | 1.40 |
| Methyl Salicylate Flavor | — | — | — |
| Lecithin | — | 0.50 | 0.50 |
| Encapsulated Menthol/Flavor | 2.00 | 2.00 | 2.00 |
| TOTAL | 100.00 | 100.00 | 100.00 |

*50/50 combination of ML and MGK

N-substituted p-menthane carboxamides, for example N-ethyl-p-menthane-3-carboxamide (WS-3), when combined with menthone ketals such as menthone glycerol ketal, may produce synergistic cooling effects in chewing gum. It is also possible to take advantage of differing release rates of the two cooling agents to provide a fast cooling release and a long lasting cooling in the same product. For example, chewing gums may be prepared form the following formulas:

TABLE 6

|  | Example 18 | Example 19 |
|---|---|---|
| Gum Base | 25.00 | 30.00 |
| Sugar | 57.11 | 58.46 |
| Corn Syrup | 15.00 | 9.00 |
| Glycerin | 2.00 | 1.50 |
| Spearmint Oil | 0.70 | — |
| Peppermint Oil | — | 0.90 |
| WS-3 | 0.08 | 0.06 |
| Menthone Glycerol Ketal | 0.11 | 0.08 |
| TOTAL | 100.00 | 100.00 |

Additional cooling agents may also be added as in some of the following examples:

TABLE 7

|  | Example 20 | Example 21 | Example 22 | Example 23 | Example 24 | Example 25 |
|---|---|---|---|---|---|---|
| Gum Base | 48.00 | 35.00 | 30.00 | 25.00 | 22.00 | 30.00 |
| Sorbitol | 34.05 | 49.05 | 53.07 | 60.69 | 59.54 | 51.12 |
| Hydrogenated Starch Hydrolysate Syrup | — | — | — | 7.5 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | 0.30 | 0.10 | 0.08 | 0.11 | 0.13 | 0.04 |
| Menthane Glycerol Ketal | 0.05 | 0.10 | 0.20 | 0.35 | 0.05 | 0.04 |
| WS-23 | — | 0.05 | 0.05 | — | — | — |
| Menthyl Lactate | 0.30 | — | 0.20 | — | — | 0.10 |
| Menthyl Succinate | — | — | — | 0.20 | 0.08 | 0.10 |
|  | 100.00 | 100.00 | 100.00 | 100.00 | 100.00 | 100.00 |

Acyclic carboxamides, for example N-2,3-trimethyl-2-isopropyl butanamide (WS-23), may produce synergistic cooling effects when combined with menthone ketals, such as menthone glycerol ketal, in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 8

|  | Example 26 | Example 27 |
|---|---|---|
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| WS-23 | 0.08% | 0.06% |
| Menthone Glycerol Ketal | 0.11% | 0.08% |
| TOTAL | 100.00 | 100.00 |

Additional cooling agents may also be added as in some of the following examples:

TABLE 9

|  | Example 28 | Example 29 | Example 30 | Example 31 | Example 32 | Example 33 |
|---|---|---|---|---|---|---|
| Gum Base | 48.00 | 35.00 | 30.00 | 25.00 | 22.00 | 30.00 |
| Sorbitol | 34.05 | 48.90 | 53.07 | 60.69 | 59.54 | 50.87 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-23 | 0.30 | 0.10 | 0.08 | 0.11 | 0.13 | 0.04 |
| Menthone Glycerol Ketal | 0.05 | 0.10 | 0.20 | 0.35 | 0.05 | 0.04 |
| WS-3 | — | 0.05 | 0.05 | — | — | — |
| Menthyl Lactate | 0.30 | — | 0.20 | — | — | 0.10 |
| Menthyl Succinate | — | — | — | 0.20 | 0.08 | 0.10 |
| Menthol | — | 0.15 | — | — | — | 0.25 |
|  | 100.00 | 100.00 | 100.00 | 100.00 | 100.00 | 100.00 |

Acyclic carboxamides, for example N-2,3-trimethyl-2-isopropyl butanamide (WS-23), may produce synergistic cooling effects when combined with menthol in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 10

|  | Example 34 | Example 35 |
|---|---|---|
| Gum Base | 25.00% | 30.00% |
| Sugar | 56.76% | 58.29% |
| Corn Syrup | 15.00% | 9.00% |
| Glycerin | 2.00% | 1.50% |
| Spearmint Oil | 0.70% | — |
| Peppermint Oil | — | 0.90% |
| WS-23 | 0.04% | 0.06% |
| Menthol | 0.50% | 0.25% |
| TOTAL | 100.00 | 100.00 |

Additional cooling agents may also be added as in some of the following examples:

TABLE 11

|  | Example 36 | Example 37 | Example 38 | Example 39 | Example 40 | Example 41 |
|---|---|---|---|---|---|---|
| Gum Base | 48.00 | 35.00 | 30.00 | 25.00 | 22.00 | 30.00 |
| Sorbitol | 33.85 | 48.60 | 53.12 | 60.69 | 59.54 | 50.46 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-23 | 0.30 | 0.10 | 0.08 | 0.11 | 0.13 | 0.04 |
| Menthol | 0.25 | 0.40 | 0.15 | 0.35 | 0.05 | 0.45 |
| WS-3 | — | 0.05 | 0.05 | — | — | — |
| Menthyl Lactate | 0.30 | — | 0.20 | — | — | 0.10 |
| Menthyl Succinate | — | — | — | 0.20 | 0.08 | 0.10 |
| Menthone Glycerol Ketal | — | 0.15 | — | — | — | 0.25 |
|  | 100.00 | 100.00 | 100.00 | 100.00 | 100.00 | 100.00 |

Menthyl succinate may produce synergistic cooling effects when combined with acyclic carboxamides, for example N-2,3-trimethyl-2-isopropyl butanamide (WS-23), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 12

|  | Example 42 | Example 43 |
|---|---|---|
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| WS-23 | 0.08% | 0.06% |
| Menthyl Succinate | 0.11% | 0.08% |
| TOTAL | 100.00 | 100.00 |

Additional cooling agents may also be added as in some of the following examples:

TABLE 13

|  | Example 44 | Example 45 | Example 46 | Example 47 | Example 48 | Example 49 |
| --- | --- | --- | --- | --- | --- | --- |
| Gum Base | 48.00 | 35.00 | 30.00 | 25.00 | 22.00 | 30.00 |
| Sorbitol | 34.05 | 48.85 | 52.57 | 60.69 | 59.24 | 51.12 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | — | — | 0.08 | 0.16 | — | — |
| Menthone Glycerol Ketal | — | — | — | — | 0.05 | 0.04 |
| WS-23 | 0.30 | 0.05 | 0.05 | 0.20 | 0.13 | 0.04 |
| Menthyl Lactate | 0.30 | 0.10 | 0.20 | 0.10 | — | 0.10 |
| Menthyl Succinate | 0.05 | 0.10 | 0.20 | 0.20 | 0.08 | 0.10 |
| Menthol | — | 0.20 | 0.50 | — | 0.30 | — |
|  | 100.00 | 100.00 | 100.00 | 100.00 | 100.00 | 100.00 |

Menthyl succinate may produce synergistic cooling effects when combined with menthone ketals, such menthone glycerol ketal, in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 14

|  | Example 50 | Example 51 |
| --- | --- | --- |
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| Menthyl Succinate | 0.08% | 0.06% |
| Menthone Glycerol Ketal | 0.11% | 0.08% |
| TOTAL | 100.00 | 100.00 |

Additional cooling agents may also be added as in some of the following examples:

TABLE 15

|  | Example 52 | Example 53 | Example 54 | Example 55 | Example 56 | Example 57 |
| --- | --- | --- | --- | --- | --- | --- |
| Gum Base | 48.00 | 35.00 | 30.00 | 25.00 | 22.00 | 30.00 |
| Sorbitol | 34.05 | 48.85 | 52.57 | 60.69 | 59.24 | 51.12 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | — | — | — | 0.05 | 0.08 | — |
| Menthone Glycerol Ketal | 0.05 | 0.10 | 0.20 | 0.35 | 0.10 | 0.07 |
| WS-23 | — | 0.05 | 0.05 | — | — | — |
| Menthyl Lactate | 0.30 | — | 0.20 | — | — | 0.10 |
| Menthyl Succinate | 0.30 | 0.10 | 0.08 | 0.26 | 0.08 | 0.11 |
| Menthol | — | 0.20 | 0.50 | — | 0.30 | — |
|  | 100.00 | 100.00 | 100.00 | 100.00 | 100.00 | 100.00 |

Menthyl succinate may produce synergistic cooling effects when combined with menthyl lactate in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 16

|  | Example 58 | Example 59 |
| --- | --- | --- |
| Gum Base | 25.00% | 30.00% |
| Sugar | 57.11% | 58.46% |
| Corn Syrup | 15.00% | 9.00% |

TABLE 16-continued

|  | Example 58 | Example 59 |
| --- | --- | --- |
| Glycerin | 2.00% | 1.50% |
| Spearmint Oil | 0.70% | — |
| Peppermint Oil | — | 0.90% |
| Menthyl Lactate | 0.08% | 0.06% |
| Menthyl Succinate | 0.11% | 0.08% |
| TOTAL | 100.00 | 100.00 |

Additional cooling agents may also be added as in some of the following examples:

TABLE 17

|  | Example 60 | Example 61 | Example 62 | Example 63 | Example 64 | Example 65 |
| --- | --- | --- | --- | --- | --- | --- |
| Gum Base | 48.00 | 35.00 | 30.00 | 25.00 | 22.00 | 30.00 |
| Sorbitol | 34.05 | 48.85 | 52.57 | 60.69 | 59.24 | 51.12 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | 0.10 | — | 0.08 | — | — | 0.04 |
| Menthone Glycerol Ketal | 0.05 | — | — | 0.11 | 0.05 | 0.04 |
| WS-23 | — | 0.05 | 0.05 | — | — | — |
| Menthyl Lactate | 0.30 | 0.10 | 0.25 | 0.35 | 0.13 | 0.10 |
| Menthyl Succinate | 0.20 | 0.10 | 0.15 | 0.20 | 0.08 | 0.10 |
| Menthol | — | 0.20 | 0.50 | — | 0.30 | — |
|  | 100.00 | 100.00 | 100.00 | 100.00 | 100.00 | 100.00 |

Menthyl succinate may produce synergistic cooling effects when combined with N-substituted p-menthane carboxamides, for example N-ethyl-p-menthane-3-carboxamide (WS-3), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 18

|  | Example 66 | Example 67 |
|---|---|---|
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| WS-3 | 0.08% | 0.06% |
| Menthyl Succinate | 0.11% | 0.08% |
| TOTAL | 100.00 | 100.00 |

Additional cooling agents may also be added as in some of the following examples:

TABLE 19

|  | Example 68 | Example 69 | Example 70 | Example 71 | Example 72 | Example 73 |
|---|---|---|---|---|---|---|
| Gum Base | 48.00 | 35.00 | 30.00 | 25.00 | 22.00 | 30.00 |
| Sorbitol | 34.05 | 48.85 | 52.57 | 60.69 | 59.24 | 51.12 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | 0.30 | 0.10 | 0.08 | 0.25 | 0.13 | 0.04 |
| Menthone Glycerol Ketal | — | — | — | 0.05 | 0.05 | 0.04 |
| WS-23 | — | 0.05 | 0.05 | 0.06 | — | — |
| Menthyl Lactate | 0.30 | — | 0.20 | 0.10 | — | 0.10 |
| Menthyl Succinate | 0.05 | 0.10 | 0.20 | 0.20 | 0.08 | 0.10 |
| Menthol | — | 0.20 | 0.50 | — | 0.30 | — |
|  | 100.00 | 100.00 | 100.00 | 100.00 | 100.00 | 100.00 |

N-substituted p-menthane carboxamides, for example N-ethyl-p-menthane-3-carboxamide (WS-3), may produce synergistic cooling effects when combined with acyclic carboxamides, for example N-2,3-trimethyl-2-isopropyl-butanamide (WS-23), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 20

|  | Example 74 | Example 75 |
|---|---|---|
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| WS-3 | 0.08% | 0.06% |
| WS-23 | 0.11% | 0.08% |
| TOTAL | 100.00 | 100.00 |

Additional cooling agents may also be added as in some of the following examples:

TABLE 21

|  | Example 76 | Example 77 | Example 78 | Example 79 | Example 80 | Example 81 |
|---|---|---|---|---|---|---|
| Gum Base | 48.00 | 35.00 | 30.00 | 25.00 | 22.00 | 30.00 |
| Sorbitol | 34.05 | 48.85 | 52.57 | 60.69 | 59.24 | 51.08 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | 0.30 | 0.10 | 0.08 | 0.21 | 0.13 | 0.04 |
| Menthone Glycerol Ketal | — | — | — | 0.10 | 0.05 | 0.04 |
| WS-23 | 0.05 | 0.15 | 0.25 | 0.10 | 0.04 | 0.10 |
| Menthyl Lactate | 0.30 | — | 0.20 | 0.05 | — | 0.07 |
| Menthyl Succinate | — | — | — | 0.20 | 0.04 | 0.07 |
| Menthol | — | 0.20 | 0.50 | — | 0.30 | — |
|  | 100.00 | 100.00 | 100.00 | 100.00 | 100.00 | 100.00 |

Menthyl salicylate (wintergreen) may produce synergistic cooling effects when combined with acyclic carboxamides, for example N-2,3-trimethyl-2-isopropyl butanamide (WS-23), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 22

|  | Example 82 | Example 83 |
|---|---|---|
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| WS-23 | 0.08% | 0.06% |
| Methyl salicylate | 0.11% | 0.08% |
| TOTAL | 100.00 | 100.00 |

Additional cooling agents may also be added as in some of the following examples:

TABLE 23

|  | Example 84 | Example 85 | Example 86 | Example 87 | Example 88 | Example 89 |
|---|---|---|---|---|---|---|
| Gum Base | 48.00 | 35.00 | 30.00 | 25.00 | 22.00 | 30.00 |
| Sorbitol | 34.05 | 48.40 | 51.77 | 60.74 | 59.24 | 51.02 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.70 | 0.80 | 1.20 | 0.70 | 0.90 | 1.00 |
| Peppermint Oil | 1.00 | 0.40 | — | 0.20 | — | — |
| Spearmint Oil | 0.10 | — | 0.40 | — | — | 0.30 |
| WS-3 | 0.20 | 0.50 | 0.08 | — | — | 0.04 |
| Menthone Glycerol Ketal | 0.05 | 0.10 | 0.20 | 0.35 | 0.05 | 0.04 |
| WS-23 | 0.30 | 0.10 | 0.05 | 0.11 | 0.13 | 0.08 |
| Menthyl Lactate | 0.30 | — | 0.20 | — | — | 0.06 |
| Menthyl Succinate | — | — | — | 0.20 | 0.08 | 0.06 |
| Menthol | — | 0.20 | 0.50 | — | 0.30 | — |
|  | 100.00 | 100.00 | 100.00 | 100.00 | 100.00 | 100.00 |

Menthyl salicylate (wintergreen) may produce synergistic cooling effects when combined with N-substituted p-menthane carboxamides, for example N-ethyl-p-menthane-3-carboxamide (WS-3), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 24

|  | Example 90 | Example 91 |
|---|---|---|
| Gum Base | 25.00% | 30.00% |
| Sugar | 57.11% | 58.46% |
| Corn Syrup | 15.00% | 9.00% |

TABLE 24-continued

|  | Example 90 | Example 91 |
|---|---|---|
| Glycerin | 2.00% | 1.50% |
| Spearmint Oil | 0.70% | — |
| Peppermint Oil | — | 0.90% |
| WS-3 | 0.08% | 0.06% |
| Methyl Salicylate | 0.11% | 0.08% |
| TOTAL | 100.00 | 100.00 |

Additional cooling agents may also be added as in some of the following examples:

TABLE 25

|  | Example 92 | Example 93 | Example 94 | Example 95 | Example 96 | Example 97 |
|---|---|---|---|---|---|---|
| Gum Base | 48.00 | 35.00 | 30.00 | 25.00 | 22.00 | 30.00 |
| Sorbitol | 34.05 | 48.85 | 51.77 | 59.75 | 58.94 | 51.02 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.85 | 0.80 | 1.20 | 0.70 | 0.90 | 1.00 |
| Peppermint Oil | 1.00 | 0.40 | — | 1.20 | 0.20 | — |
| Spearmint Oil | 0.15 | — | 0.40 | — | — | 0.30 |
| WS-3 | 0.25 | 0.20 | 0.08 | 0.20 | 0.13 | 0.04 |
| Menthone Glycerol Ketal | — | — | 0.10 | 0.25 | 0.05 | 0.04 |
| WS-23 | 0.10 | 0.05 | 0.05 | — | 0.10 | — |
| Menthyl Lactate | 0.30 | — | 0.20 | — | — | 0.10 |
| Menthyl Succinate | — | — | 0.10 | 0.20 | 0.08 | 0.10 |
| Menthol | — | 0.20 | 0.50 | — | 0.30 | — |
|  | 100.00 | 100.00 | 100.00 | 100.00 | 100.00 | 100.00 |

The cooling agent 3-I-menthoxypropane-1,2-diol (TCA) from Takasago may produce synergistic cooling effects when combined with menthone ketals, such as menthone glycerol ketal, in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 26

|  | Example 98 | Example 99 |
| --- | --- | --- |
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| TCA | 0.08% | 0.06% |
| Menthone Glycerol Ketal | 0.11% | 0.08% |
| TOTAL | 100.00 | 100.00 |

Additional cooling agents may also be added as in some of the following examples:

TABLE 27

|  | Example 100 | Example 101 | Example 102 | Example 103 | Example 104 | Example 105 |
| --- | --- | --- | --- | --- | --- | --- |
| Gum Base | 48.00 | 35.00 | 30.00 | 25.00 | 22.00 | 30.00 |
| Sorbitol | 34.05 | 48.90 | 53.07 | 60.69 | 59.54 | 50.87 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| TCA | 0.30 | 0.10 | 0.08 | 0.11 | 0.13 | 0.04 |
| Menthone Glycerol Ketal | 0.05 | 0.10 | 0.20 | 0.35 | 0.05 | 0.04 |
| WS-3 | — | 0.05 | 0.05 | — | — | — |
| Menthyl Lactate | 0.30 | — | 0.20 | — | — | 0.10 |
| Menthyl Succinate | — | — | — | 0.20 | 0.08 | 0.10 |
| Menthol | — | 0.15 | — | — | — | 0.25 |
|  | 100.00 | 100.00 | 100.00 | 100.00 | 100.00 | 100.00 |

The Takasago cooling agent (TCA) may produce synergistic cooling effects when combined with menthol in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 28

|  | Example 106 | Example 107 |
| --- | --- | --- |
| Gum Base | 25.00% | 30.00% |
| Sugar | 56.76% | 58.29% |
| Corn Syrup | 15.00% | 9.00% |
| Glycerin | 2.00% | 1.50% |
| Spearmint Oil | 0.70% | — |
| Peppermint Oil | — | 0.90% |
| TCA | 0.04% | 0.06% |
| Menthol | 0.50% | 0.25% |
| TOTAL | 100.00 | 100.00 |

Additional cooling agents may also be added as in some of the following examples:

The cooling agent 3-I-menthoxypropane-1,2-diol may produce synergistic cooling effects when combined with acyclic carboxamides, for example N-2,3-trimethyl-2-isopropyl butanamide (WS-23), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 30

|  | Example 114 | Example 115 |
| --- | --- | --- |
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |
| WS-23 | 0.08% | 0.06% |
| TCA | 0.11% | 0.08% |
| TOTAL | 100.00 | 100.00 |

Additional cooling agents may also be added as in some of the following examples:

TABLE 29

|  | Example 108 | Example 109 | Example 110 | Example 111 | Example 112 | Example 113 |
| --- | --- | --- | --- | --- | --- | --- |
| Gum Base | 48.00 | 35.00 | 30.00 | 25.00 | 22.00 | 30.00 |
| Sorbitol | 33.85 | 48.60 | 53.12 | 60.69 | 59.54 | 50.46 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| TCA | 0.30 | 0.10 | 0.08 | 0.11 | 0.13 | 0.04 |
| Menthol | 0.25 | 0.40 | 0.15 | 0.35 | 0.05 | 0.45 |
| WS-3 | — | 0.05 | 0.05 | — | — | — |
| Menthyl Lactate | 0.30 | — | 0.20 | — | — | 0.10 |
| Menthyl Succinate | — | — | — | 0.20 | 0.08 | 0.10 |
| Menthone Glycerol Ketal | — | 0.15 | — | — | — | 0.25 |
|  | 100.00 | 100.00 | 100.00 | 100.00 | 100.00 | 100.00 |

TABLE 31

|  | Example 116 | Example 117 | Example 118 | Example 119 | Example 120 | Example 121 |
|---|---|---|---|---|---|---|
| Gum Base | 48.00 | 35.00 | 30.00 | 25.00 | 22.00 | 30.00 |
| Sorbitol | 34.05 | 48.85 | 52.57 | 60.69 | 59.24 | 51.12 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | — | — | 0.08 | 0.16 | — | — |
| Menthone Glycerol Ketal | — | — | — | — | 0.05 | 0.04 |
| WS-23 | 0.30 | 0.05 | 0.05 | 0.20 | 0.13 | 0.04 |
| Menthyl Lactate | 0.30 | 0.10 | 0.20 | 0.10 | — | 0.10 |
| TCA | 0.05 | 0.10 | 0.20 | 0.20 | 0.08 | 0.10 |
| Menthol | — | 0.20 | 0.50 | — | 0.30 | — |
|  | 100.00 | 100.00 | 100.00 | 100.00 | 100.00 | 100.00 |

The cooling agent 3-I-menthoxypropane-1,2-diol may produce synergistic cooling effects when combined with N-substituted p-menthane carboxamides, for example N-ethyl-p-menthane-3-carboxamide (WS-3), in chewing gum. It is also possible to take advantage of differing release rates of the two cooling agents to provide a fast cooling release and a long lasting cooling in the same product. Also, reductions in bitterness may be achieved through optimization of the levels of these cooling agents. For example, chewing gums may be prepared from the following formulas:

TABLE 32

|  | Example 122 | Example 123 |
|---|---|---|
| Gum Base | 25.00% | 30.00% |
| Sugar | 57.11% | 58.46% |
| Corn Syrup | 15.00% | 9.00% |
| Glycerin | 2.00% | 1.50% |
| Spearmint Oil | 0.70% | — |
| Peppermint Oil | — | 0.90% |

TABLE 32-continued

|  | Example 122 | Example 123 |
|---|---|---|
| WS-3 | 0.08% | 0.06% |
| TCA | 0.11% | 0.08% |
| TOTAL | 100.00 | 100.00 |

Additional cooling agents may also be added as in some of the following examples:

TABLE 33

|  | Example 124 | Example 125 | Example 126 | Example 127 | Example 128 | Example 129 |
|---|---|---|---|---|---|---|
| Gum Base | 48.00 | 35.00 | 30.00 | 25.00 | 22.00 | 30.00 |
| Sorbitol | 34.05 | 48.85 | 52.57 | 60.69 | 59.24 | 51.12 |
| Hydrogenated Starch Hydrolysate Syrup | — | — | — | 7.50 | 14.00 | 10.00 |
| 70% Sorbitol Solution | 10.00 | 8.00 | — | — | — | — |
| Glycerin | 5.00 | 6.00 | 15.00 | 5.00 | 3.00 | 7.00 |
| Encapsulated Aspartame | 0.30 | 0.50 | 0.60 | 0.20 | 0.30 | 0.40 |
| Methyl Salicylate | 0.50 | — | — | — | 0.70 | — |
| Peppermint Oil | 1.30 | 0.40 | — | 0.95 | 0.20 | 1.20 |
| Spearmint Oil | 0.20 | 0.80 | 0.80 | — | — | — |
| WS-3 | 0.30 | 0.10 | 0.08 | 0.25 | 0.13 | 0.04 |
| Menthone Glycerol Ketal | — | — | — | 0.05 | 0.05 | 0.04 |
| WS-23 | — | 0.05 | 0.05 | 0.06 | — | — |
| Menthyl Lactate | 0.30 | — | 0.20 | 0.10 | — | 0.10 |
| TCA | 0.05 | 0.10 | 0.20 | 0.20 | 0.08 | 0.10 |
| Menthol | — | 0.20 | 0.50 | — | 0.30 | — |
|  | 100.00 | 100.00 | 100.00 | 100.00 | 100.00 | 100.00 |

The above tables show formulations in a peppermint flavored, spearmint flavored or wintergreen flavored chewing gum. Other gum products can be made with other flavors as well. Menthol and/or physiological cooling agents may enhance these various types of flavors, such as menthol-eucalyptus, spearmint-menthol, cinnamon-menthol, and even fruity mint-menthol.

The formulations for various flavored gum formulas are found in tables 34 and 35. Again, the cooling agents may (Examples 130-136) or may not be encapsulated, depending on whether a modified release is desired.

TABLE 34

VARIOUS-FLAVORED SUGARLESS GUM

|  | Example 130 | Example 131 | Example 132 | Example 133 |
|---|---|---|---|---|
| Gum Base | 30.00 | 30.00 | 30.00 | 30.00 |
| Calcium Carbonate | 5.00 | 5.00 | 5.00 | 5.00 |
| Sorbitol | 54.60 | 53.68 | 53.80 | 55.05 |
| Glycerin | 8.00 | 8.00 | 8.00 | 7.00 |
| Encapsulated Sweetener | 0.50 | 0.50 | 0.50 | 0.50 |
| Flavor | 1.00[A] | 1.50[B] | 1.40[B] | 1.60[C] |
| Menthol | 0.20 | 0.12 | 0.30 | 0.20 |
| Active ML/PMC[D] | 0.10 | 0.20 | 0.10 | 0.05 |
| Lecithin | 0.60 | 0.60 | 0.60 | 0.60 |
| Encapsulated Menthol | — | 0.40 | 0.30 | — |
| TOTAL | 100.00 | 100.00 | 100.00 | 100.00 |

[A] Spearmint Flavor
[B] Menthol-Eucalyptus Flavor
[C] Cinnamon-Menthol Flavor
[D] 50/50 blend of ML and PMC compounds

TABLE 35

VARIOUS-FLAVORED SUGARLESS GUM

|  | Example 134 | Example 135 | Example 136 |
|---|---|---|---|
| Gum Base | 30.00 | 30.00 | 30.00 |
| Calcium Carbonate | 5.00 | 5.00 | 5.00 |
| Sorbitol | 53.90 | 52.30 | 52.30 |
| Glycerin | 8.00 | 10.00 | 10.00 |
| Encapsulated Sweetener | 0.50 | 0.60 | 0.60 |
| Flavor | 1.60[C] | 1.20[D] | 1.20[D] |
| Menthol | 0.20 | 0.20 | 0.10 |
| Active ML/Acyclic Carboxamide (AC)* | 0.20 | 0.10 | 0.20 |
| Lecithin | 0.60 | 0.60 | 0.60 |
| Encapsulated Menthol | — | — | — |
| TOTAL | 100.00 | 100.00 | 100.00 |

*50/50 blend of ML and acyclic carboxamide (AC)
[C] Cinnamon-Menthol Flavor
[D] Fruity-Mint Menthol Flavor The combination of physiological cooling agents may be used in a wide variety of sugarless and sugar chewing gum formulations. The cooling agents may be encapsulated or entrapped in a wide variety of controlled release techniques as previously discussed. Gum formulations in which these materials may be used are given in tables 36-42. These formulas may also be made with non-encapsulated physiological cooling agents. Examples of the techniques and resulting controlled release physiological cooling agents that may be used in these formulations are discussed in the examples following the tables.

TABLE 36

Regular-Tack Sugarless Gum

|  | Example 137 | Example 138 | Example 139 | Example 140 | Example 141 |
|---|---|---|---|---|---|
| Sorbitol | 50.00 | 50.00 | 50.00 | 50.00 | 50.00 |
| Gum Base | 24.70 | 24.70 | 24.70 | 24.70 | 24.70 |
| Lecithin | 0.20 | 0.20 | 0.18 | 0.18 | 0.18 |
| Glycerin | 2.00 | 2.00 | 2.00 | 5.00 | 8.00 |
| Lycasin | 14.40 | 12.00 | 12.00 | 9.00 | 6.00 |
| Mannitol | 7.10 | 9.50 | 9.48 | 9.53 | 9.53 |
| Peppermint Flavor | 1.40 | 1.40 | 1.44 | 1.44 | 1.44 |
| Active Level of Cooling Agents | 0.20 | 0.20 | 0.20 | 0.15 | 0.15 |
| TOTAL | 100.00 | 100.00 | 100.00 | 100.00 | 100.00 |

TABLE 37

Regular-Tack Sugarless Gum

|  | Example 142 | Example 143 | Example 144 | Example 145 | Example 146 |
|---|---|---|---|---|---|
| Sorbitol | 49.35 | 49.35 | 49.35 | 49.35 | 49.35 |
| Gum Base | 25.50 | 25.50 | 25.50 | 25.50 | 25.50 |
| Lecithin | 0.20 | 0.20 | 0.20 | 0.20 | 0.20 |
| Glycerin | 8.50 | 8.50 | 8.50 | 8.60 | 8.50 |
| Liquid Sorbitol | 6.80 | 6.80 | 6.80 | 6.80 | 6.90 |
| Mannitol | 8.00 | 8.00 | 8.00 | 8.00 | 8.00 |
| Active Level of Cooling Agents | 0.20 | 0.20 | 0.20 | 0.10 | 0.10 |
| Peppermint Flavor | 1.45 | 1.45 | 1.45 | 1.45 | 1.45 |
| TOTAL | 100.00 | 100.00 | 100.00 | 100.00 | 100.00 |

TABLE 38

Sugarless Pellet Gums for Coating

|  | Example 147 | Example 148 | Example 149 | Example 150 | Example 151 |
|---|---|---|---|---|---|
| Sorbitol | 51.16 | 43.87 | 45.92 | 43.81 | 46.33 |
| Gum Base | 31.01 | 33.00 | 32.71 | 33.03 | 30.97 |
| Glycerin | 6.14 | 8.00 | 7.50 | 7.98 | 7.82 |
| Aspartame | 0.06 | — | 0.10 | — | 0.08 |
| Active Level of Cooling Agents | 0.42 | 0.23 | 0.35 | 0.25 | 0.34 |
| Calcium Carbonate | 10.01 | 13.00 | 12.16 | 12.93 | 13.04 |
| Peppermint Flavor | — | 1.20 | 0.17 | — | 1.01 |
| Menthol | — | 0.50 | — | — | 0.21 |
| Fruit Flavor | — | — | — | 1.50 | — |
| Lemon Flavor | — | — | — | .50 | — |
| Encapsulated Menthol | — | 0.20 | — | — | 0.20 |
| Spearmint Flavor | 1.20 | — | 1.09 | — | — |
| TOTAL | 100.00 | 100.00 | 100.00 | 100.00 | 100.00 |

TABLE 39

Sugarless Bubble Gums

|  | Example 152 | Example 153 | Example 154 | Example 155 |
|---|---|---|---|---|
| Sorbitol | 56.65 | 56.09 | 50.42 | 48.63 |
| Gum Base | 24.00 | 24.59 | 28.00 | 30.10 |
| Lecithin | 1.00 | 0.91 | 0.89 | 0.86 |
| Fruit Flavor | 1.20 | 1.41 | — | — |
| Grape Flavor | — | — | 1.71 | — |
| Strawberry Flavor | — | — | — | 1.41 |
| Evaporated Lycasin/Glycerin* | — | 6.79 | 9.61 | 10.41 |
| Glycerin | 17.00 | 10.00 | 9.00 | 8.21 |
| Free Aspartame | 0.04 | — | 0.06 | 0.17 |
| Active Level of Cooling Agents | 0.11 | 0.21 | 0.31 | 0.21 |
| TOTAL | 100.00 | 100.00 | 100.00 | 100.00 |

*Contains 25% glycerin, 67.5% Lycasin brand hydrogenated starch hydrolsate solids and 7.5% water.

TABLE 40

Sugar Gums

|  | Example 156 | Example 157 | Example 158 | Example 159 | Example 160 |
|---|---|---|---|---|---|
| Sugar | 58.29 | 59.26 | 62.49 | 59.97 | 56.61 |
| Gum Base | 22.38 | 20.60 | 20.08 | 23.17 | 26.80 |
| Corn Syrup | 17.20 | 18.50 | 15.40 | 14.70 | 13.88 |
| Glycerin | 1.09 | 0.83 | 1.00 | 1.00 | 1.30 |
| Active Level of Cooling Agents | 0.10 | 0.20 | 0.15 | 0.25 | 0.20 |
| Lecithin | 0.05 | 0.03 | 0.02 | — | — |
| Peppermint Flavor | 0.89 | 0.58 | 0.86 | 0.91 | 1.21 |
| TOTAL | 100.00 | 100.00 | 100.00 | 100.00 | 100.00 |

TABLE 41

Sugar Gums

|  | Example 161 | Example 162 | Example 163 | Example 164 | Example 165 |
|---|---|---|---|---|---|
| Sugar | 54.30 | 45.30 | 49.30 | 40.30 | 45.30 |
| Gum Base | 19.20 | 19.20 | 19.20 | 19.20 | 19.20 |
| Glycerin | 1.40 | 1.40 | 1.40 | 1.40 | 1.40 |
| Corn Syrup | 19.00 | 23.00 | 19.00 | 19.00 | 23.00 |
| Dextrose | — | 5.00 | — | — | — |
| Lactose | 5.00 | — | — | — | — |
| Fructose | — | 5.00 | — | — | — |
| Invert Sugar | — | — | 10.00 | — | — |
| Maltose | — | — | — | 10.00 | — |
| Palatinose | — | — | — | — | 10.00 |
| Spearmint Flavor | 0.90 | 0.90 | 0.90 | 9.90 | 0.90 |
| Active Level of Cooling Agents | 0.20 | 0.20 | 0.20 | 0.20 | 0.20 |
| TOTAL | 100.00 | 100.00 | 100.00 | 100.00 | 100.00 |

TABLE 42

Sugarless Gums

|  | Example 166 | Example 167 | Example 168 | Example 169 | Example 170 | Example 171 | Example 172 | Example 173 |
|---|---|---|---|---|---|---|---|---|
| Gum Base | 25.50 | 25.50 | 25.50 | 25.50 | 25.50 | 25.50 | 25.50 | 25.50 |
| Sorbitol | 53.80 | 46.80 | 41.80 | 41.80 | 41.80 | 41.80 | 36.80 | 37.80 |
| Sorbitol Liquid/Lycasin | 17.00 | 14.00 | 6.00 | — | 5.00 | — | — | 11.00$^A$ |
| Mannitol | — | 10.00 | 8.00 | 8.00 | 8.00 | 8.00 | 8.00 | 8.00 |
| Maltitol | — | — | — | 5.00 | — | — | 5.00 | — |
| Xylitol | — | — | 15.00 | 10.00 | — | — | 5.00 | 10.00 |
| Lactitol | — | — | — | — | 10.00 | — | — | — |
| Hydrogenated Isomaltulose | — | — | — | — | — | 15.00 | 10.00 | — |
| Glycerin | 2.00 | 2.00 | 2.00 | 8.00 | 8.00 | 8.00 | 8.00 | 6.00 |
| Flavor | 1.50 | 1.50 | 1.50 | 1.50 | 1.50 | 1.50 | 1.50 | 1.50 |
| Active Level of Cooling Agents | 0.20 | 0.20 | 0.20 | 0.20 | 0.20 | 0.20 | 0.20 | 0.20 |
| TOTAL | 100.00 | 100.00 | 100.00 | 100.00 | 100.00 | 100.00 | 100.00 | 100.00 |

$^A$Lycasin brand hydrogenated starch hydrolsate syrup; all others use 70% sorbitol liquid.

Encapsulated cooling agents may be made by the Examples 174-226 that follow and added to any of the formulas given in tables 36 through 42. Encapsulations with water soluble polymers such as HPMC or maltodextrins will give a fast release of cooling agent. Encapsulations with shellac, Zein or PVAC will give a slow release.

Example 174

This example contains a cooling agent composition which has 25% menthyl succinate and 75% PMC entrapped with polyvinyl-acetate.

Example 175

This example contains a cooling agent composition containing 50% menthyl succinate and 50% PMC agglomerated with hydroxypropylmethyl cellulose.

Example 176

This example contains a cooling agent composition which has 75% menthyl succinate and 25% PMC coated with Zein.

Example 177

This example contains a cooling agent composition which has 25% menthyl lactate and 75% MGK absorbed onto silica.

Example 178

This example contains a cooling agent composition which has 50% menthyl succinate and 50% MGK coated with shellac.

Example 179

This example contains a cooling agent composition which has 25% menthyl succinate and 75% 3-I-menthoxypropane-1,2-diol (TCA) extruded with polyvinyl acetate.

Example 180

This example contains a cooling agent composition which has 50% menthyl succinate and 50% 3-I-menthoxypropane-1,2-diol (TCA) coated with shellac.

Example 181

This example contains a cooling agent composition which has 75% menthyl succinate and 25% 3-I-menthoxypropane-1,2-diol (TCA) coated with Zein.

Example 182

This example contains a cooling agent composition which has 25% menthyl succinate and 75% MGK extruded with polyvinyl acetate.

Example 183

This example contains a cooling agent composition which has 50% menthyl succinate and 50% MGK coated with Zein.

Example 184

This example contains a cooling agent composition which has 75% menthyl succinate and 25% MGK agglomerated with hydroxypropylmethyl cellulose.

Example 185

This example contains a cooling agent composition which has 25% menthyl succinate and 75% acyclic carboxamide (AC) coated with Zein.

Example 186

This example contains a cooling agent composition which has 50% menthyl succinate and 50% acyclic carboxamide (AC) coated with hydroxypropylmethyl cellulose.

Example 187

This example contains a cooling agent composition which has 75% menthyl succinate and 25% acyclic carboxamide (AC) absorbed onto silica.

Example 188

This example contains a cooling agent composition which has 25% ML and 75% 3-I-menthoxypropane-1,2-diol (TCA) agglomerated with gelatin.

Example 189

This example contains a cooling agent composition which has 50% ML and 50% 3-I-menthoxypropane-1,2-diol (TCA) absorbed onto silica.

Example 190

This example contains a cooling agent composition which has 75% ML and 25% 3-I-menthoxypropane-1,2-diol (TCA) coated with shellac.

Example 191

This example contains a cooling agent composition which has 50% ML and 50% acyclic carboxamide (AC) which is agglomerated with Zein.

Example 192

This example contains a cooling agent composition which has 25% ML and 75% acyclic carboxamide (AC) which is agglomerated with hydroxypropylmethyl cellulose.

Example 193

This example contains a cooling agent composition which has 75% ML and 25% acyclic carboxamide (AC) coated with shellac.

Example 194

This example contains a cooling agent composition which has 50% menthyl lactate and 50% p-menthane carboxamide (PMC) coated with maltodextrin.

Example 195

This example contains a cooling agent composition which has 25% 3-I-menthoxypropane-1,2-diol and 75% acyclic carboxamide (AC) extruded with polyvinyl acetate.

Example 196

This example contains a cooling agent composition which has 50% 3-I-menthoxypropane-1,2-diol and 50% p-menthane carboxamide (PMC) agglomerated with Zein.

Example 197

An 80% shellac, 20% active cooling agent powder mixture is obtained by spray drying an alcohol/shellac/menthyl succinate and menthyl lactate solution.

Example 198

A 50% shellac, 50% active cooling agent powder mixture is obtained by spray drying an appropriate ratio of alcohol/shellac/menthyl succinate and menthyl lactate solution.

Example 199

A 70% Zein, 30% active cooling agent powder mixture is obtained by spray drying an alcohol/shellac/menthyl succinate and menthyl lactate solution.

Example 200

A shellac/silica/active cooling agent powder mixture is obtained by fluid-bed coating menthyl lactate and MGK absorbed on silica with an alcohol/shellac solution at 20% solids.

Example 201

A shellac/silica/active cooling agent powder mixture is obtained by fluid-bed coating menthyl succinate and 3-I-menthoxypropane-1,2-diol (TCA) absorbed on silica with an alcohol/shellac solution at 20% solids.

Example 202

A Zein/silica/active cooling agent mixture is obtained by fluid-bed coating menthyl succinate and menthyl lactate absorbed on silica with an alcohol/Zein solution at 25% solids.

Example 203

An 85% wax, 15% active PMC and AC powder mixture is obtained by spray chilling a mixture of molten wax and cooling agent.

Example 204

A 70% wax, 30% active PMC and AC powder mixture is obtained by spray chilling a mixture of molten wax and cooling agent.

Example 205

A 70% Zein, 30% active menthyl succinate and p-menthane carboxamide (PMC) powder mixture is obtained by spray drying an aqueous mixture of cooling agent and Zein dispersed in an aqueous, high-pH (pH=11.6-12.0) media at 15% solids.

Example 206

A Zein/active menthyl succinate and p-menthane carboxamide (PMC) powder mixture is obtained by fluid-bed coating cooling agent with an aqueous, high-pH (pH=11.6-12.0) Zein dispersion of 15% solids.

Example 207

A 20% Zein, 20% shellac, 60% active menthyl succinate and AC powder mixture is obtained by spray drying an alcohol/shellac/cooling agent mixture and then fluid-bed coating the spray dried product for a second coating of alcohol and Zein.

Examples 197-207 would all give nearly complete encapsulation and would delay the release of the cooling agents when used in gum formulations in tables 36 through 42. The higher levels of coating would give a longer delayed release of the cooling agents than the lower levels of coating.

Other polymers that are more water soluble and used in coating would have less of an effect of delaying the release of the cooling agents.

Example 208

An 80% gelatin, 20% active PMC and TCA compounds powder mixture is obtained by spray drying a gelatin/TCA and PMC compounds emulsion.

Example 209

A 50% hydroxypropylmethyl cellulose (HPMC), 50% active menthyl succinate and PMC compounds powder mixture is obtained by fluid-bed coating menthyl succinate and PMC compounds with an aqueous solution of HPMC at 10% solids.

Example 210

A 30% ethyl cellulose, 70% active menthyl succinate and PMC compounds powder mixture is obtained by fluid-bed coating menthyl succinate and PMC compounds with an aqueous solution of ethyl cellulose at 10% solids.

Example 211

A 50% maltodextrin, 50% active TCA and AC compounds powder mixture is obtained by spray drying an aqueous emulsion of TCA and AC compounds and maltodextrin at 40% solids.

Example 212

A 50% gum arabic, 50% active TCA and AC compounds powder mixture is obtained by fluid-bed coating TCA and AC compounds absorbed on silica, then with an aqueous solution of gum arabic at 40% solids.

The coated TCA and PMC compounds from Example 208, and the coated menthyl succinate and PMC compounds of Examples 209 and 210, when used in the chewing gum formula in tables 36 through 42, would give a moderately fast release of cooling agents. The products coated with maltodextrin and gum arabic in Examples 211 and 212, when used in the gum formula in tables 36 through 42, would give a fast release of the cooling agents.

Cooling agents could also be used in gum after being agglomerated to give modified release of these cooling agents.

Example 213

A 15% hydroxypropylmethyl cellulose (HPMC), 85% active TCA and PMC compounds powder mixture can be prepared by agglomerating TCA and PMC compounds and HPMC blended together, with water being added, and the resulting product being dried and ground.

Example 214

A 15% gelatin, 85% active TCA and PMC compounds powder mixture can be made by agglomerating TCA and PMC compounds and gelatin blended together, with water being added, and the resulting product being dried and ground.

Example 215

A 10% Zein, 90% active TCA and AC compounds powder mixture can be made by agglomerating TCA and AC compounds with an aqueous solution containing Zein, and drying and grinding the resulting product.

Example 216

A 15% shellac, 85% active TCA and AC compounds powder mixture can be made by agglomerating TCA and AC compounds with an alcohol solution containing 25% shellac, and drying and grinding the resulting product.

Examples of multiple step treatments are here described:

Example 217

Menthyl succinate and TCA are spray dried with maltodextrin at 30% solids to prepare a powder. This powder is then agglomerated with a hydroxypropylmethyl cellulose (HPMC) in a ratio of 85/15 powder/HPMC, wetted with water and dried. After grinding the resulting powder will contain about 68% active cooling agent, 17% maltodextrin and 15% HPMC.

Example 218

Menthyl succinate and ML is agglomerated with HPMC in a ratio of 85/15 cooling agent/HPMC. After drying and grinding, the resulting powder is fluid-bed coated with an alcohol shellac solution at about 25% solids to give a final product containing about 60% active cooling agent, 10% HPMC, and about 30% shellac.

Example 219

Menthyl succinate and ML is agglomerated with HPMC in a ratio of 85/15 cooling agent/HPMC. After drying and grinding, the resulting powder is agglomerated with a 15% solids, high-pH, aqueous solution of Zein to give a final product containing about 60% active cooling agent, 10% HPMC, and 30% Zein.

Example 220

Menthyl lactate and TCA is spray dried with a 25% emulsion of gelatin. The spray dried product is then agglomerated with a 15% solids, high-pH, aqueous solution of Zein. The final product will contain about 50% active cooling agent, 20% gelatin, and 30% Zein.

Example 221

Menthyl succinate and AC is agglomerated with molten wax in a ratio of 85/15 cooling agent/wax. When the mixture cools and is ground, it is fluid-bed coated with a 10% Zein solution, giving a final product containing 60% active cooling agent, 10% wax, and 30% Zein.

Example 222

A mixture of MGK and TCA is sprayed onto a precipitated silica. The mixture is dried and ground. The final product is about 50% active cooling agent.

Example 223

A mixture of MGK and TCA is sprayed onto a pharmasorb clay. The mixture is dried and ground and gives a final product of about 80% clay and 20% active cooling agent.

Example 224

A mixture of MGK and TCA is sprayed onto a microcrystalline cellulose powder. The mixture is dried and ground and gives a product that is about 70% microcrystalline cellulose and 30% active cooling agent.

Example 225

A mixture of MGK and TCA is sprayed onto a high absorption starch. The mixture is dried and ground and gives a product that is about 80% starch and 20% active cooling agent.

Example 226

A mixture of MGK and TCA is sprayed onto a calcium carbonate powder. The mixture is dried and ground and gives a product of about 90% calcium carbonate and 10% active cooling agent.

Many of the examples listed are single step processes. However, more delayed release of the cooling agents may be obtained by combining the various processes of encapsulation, agglomeration, absorption, and entrapment. Any of the above preparations can be further treated in fluid-bed coating, spray chilling or coacervation processes to encapsulate the product, and can be agglomerated with various materials and procedures in a variety of multiple step processes.

As disclosed in many of the patents, physiological cooling agents may be added to chewing gum formulations. These chewing gums may be used as centers or cores for the chewing gum that are coated. TABLE 43 illustrates sugared chewing gum formulations that are used as centers for sugar-coated chewing gums having a coating comprising a physiological cooling agent.

TABLE 43

SUGARED CHEWING GUM CENTERS

| | Example 227 | Example 228 | Example 229 |
|---|---|---|---|
| Gum Base | 28.0% | 30.0% | 30.0% |
| Sugar | 52.9% | 50.7% | 46.6% |
| Corn Syrup | 18.0% | 18.0% | 12.0% |
| Glycerin | 0.5% | 0.5% | 0.5% |
| Spearmint Flavor | 0.6% | — | — |
| Peppermint Flavor | — | 0.8% | 0.9% |
| Dextrose Monohydrate | — | — | 10.0% |

The chewing gum formed in TABLE 43 is sheeted in pellets that are square or rectangular pillow shaped and coated with the sugar-based coating formulations in which the cooling agent and menthol are dissolved in the flavor when mixed into the coating syrup in TABLE 44.

TABLE 44

COATING FOR SUGARED CHEWING GUM CENTERS

|  | Example 230 | Example 231 | Example 232 |
|---|---|---|---|
| Sugar | 96.56 | 96.06 | 95.71 |
| Modified Starch | 3.0 | 3.0 | 3.0 |
| Spearmint Flavor | 0.3 | — | — |
| Peppermint Flavor | — | 0.6 | 0.8 |
| Menthol | — | 0.2 | 0.3 |
| Carnauba Wax | 0.04 | 0.04 | 0.04 |
| Cooling Agent* | 0.1 | 0.1 | 0.15 |

*Any of the cooling agents listed such as PMC, AC, ML, MS, MGK, TCA or combinations may be used.

In Example 230, the physiological cooling agent gives a clean, cool Spearmint flavor that could not be obtained with menthol. Examples 231 and 232 would normally require higher levels of menthol, and consequently would contain harsh notes. The addition of the physiological cooling agents to Examples 231 and 232 result in strong, clean, cool minty tasting products.

As stated previously, non-sugar or sugarless coatings generally will have less sweetness, thus causing more harsh notes when mint flavor and/or menthol are added to the coating. Use of the physiological cooling agents is especially useful in sugarless coating. Polyols such as sorbitol, xylitol, maltitol, lactitol and hydrogenated isomaltulose can be used to coat pellet sugarless gum. Examples of sugarless gum center or core formulations are found in tables 45 and 46.

TABLE 45

SUGARLESS GUM CENTERS

|  | Example 233 | Example 234 | Example 235 | Example 236 |
|---|---|---|---|---|
| Base | 33.1 | 30.0 | 30.0 | 33.0 |
| Calcium Carbonate | 15.0 | 11.0 | 11.0 | 13.0 |
| Sorbitol | 40.94 | 46.36 | 46.08 | 49.52 |
| Glycerin | 8.0 | 0.4 | 0.4 | 0.4 |
| Liquid Sorbitol | — | 6.2 | 6.2 | — |
| Encap. Sweetener | 0.7 | 0.24 | 0.24 | 0.82 |
| Wintergreen Flavor | 1.1 | — | — | — |
| Menthol | 1.1 | — | 0.26 | 0.3 |
| Cooling Agent* | 0.06 | — | 0.12 | 0.06 |
| Mannitol | — | 3.0 | 3.0 | — |
| Peppermint Flavor | — | 2.0 | 1.9 | 1.9 |
| Lecithin | — | 0.8 | 0.8 | 1.0 |
| Encap Menthol | — | — | — | — |

*Any of the cooling agents listed such as PMC, AC, ML, MS, MGK, TCA or combinations may be used.

TABLE 46

SUGARLESS GUM CENTERS

|  | Example 237 | Example 238 | Example 239 |
|---|---|---|---|
| Base | 32.0 | 31.6 | 33.6 |
| Calcium Carbonate | 15.0 | 11.0 | 13.0 |
| Sorbitol | 41.26 | 45.98 | 49.23 |
| Glycerin | 7.0 | 0.8 | 0.75 |
| Liquid Sorbitol | — | 7.2 | — |
| Encap. Sweetener | 0.40 | 0.66 | 0.66 |
| Wintergreen Flavor | — | — | — |
| Menthol | 0.9 | 0.3 | 0.3 |
| Cooling Agents* | 0.14 | 0.06 | 0.06 |
| Mannitol | — | — | — |

TABLE 46-continued

SUGARLESS GUM CENTERS

|  | Example 237 | Example 238 | Example 239 |
|---|---|---|---|
| Peppermint Flavor | 1.3 | 1.9 | 1.9 |
| Lecithin | — | 0.5 | 0.5 |
| Encap Menthol | 2.0 | — | — |

*Any of the cooling agents listed such as PMC, AC, ML, MS, MGK, TCA or combinations may be used.

The centers in tables 45 and 46 are coated with coating formulations that comprise xylitol, maltitol, lactitol, hydrogenated isomaltulose or sorbitol; various flavors; optionally menthol; and the physiological cooling agents. Examples of sugarless coated chewing gums are found in tables 47 and 48.

TABLE 47

SUGARLESS COATED CHEWING GUMS

|  | Ex. 240 | Ex. 241 | Ex. 242 | Ex. 243 | Ex. 244 |
|---|---|---|---|---|---|
| Center | Ex. 233 | Ex. 234 | Ex. 234 | Ex. 235 | Ex. 236 |
| Xylitol | 88.83 | 88.83 | — | — | — |
| Gum Arabic | 8.8 | 8.8 | 2.8 | 2.8 | 3.1 |
| Titanium Dioxide | 0.9 | 0.9 | 0.9 | 0.9 | 1.3 |
| Hydrogenated isomaltulose | — | — | 95.0 | 94.84 | 93.66 |
| Maltitol | — | — | — | — | — |
| Wintergreen Flavor | 0.9 | — | — | — | — |
| Peppermint Flavor | — | 0.9 | 0.7 | 0.7 | 0.75 |
| Menthol | 0.4 | 0.4 | 0.3 | 0.5 | 0.75 |
| Carnauba Wax | 0.1 | 0.1 | 0.1 | 0.1 | 0.1 |
| Cooling Agent* | 0.07 | 0.07 | 0.1 | 0.06 | 0.14 |
| Sweetener | — | — | 0.1 | 0.1 | 0.2 |

*Cooling agent used in the examples may contain ML, MS, MGK, AC, PMC, TCA or combinations

TABLE 48

SUGARLESS COATED CHEWING GUMS

|  | Ex. 245 | Ex. 246 | Ex. 247 | Ex. 248 |
|---|---|---|---|---|
| Center | Ex. 236 | Ex. 237 | Ex. 238 | Ex. 239 |
| Xylitol | — | — | — | — |
| Gum Arabic | 3.1 | 3.1 | 3.1 | 3.1 |
| Titanium Dioxide | 1.3 | 1.3 | 1.3 | 1.3 |
| Hydrogenated Isomaltulose | — | — | 93.59 | 93.56 |
| Maltitol | 93.66 | 93.33 | — | — |
| Wintergreen Flavor | — | — | — | — |
| Peppermint Flavor | 0.75 | 1.0 | 0.9 | 0.9 |
| Menthol | 0.75 | 1.0 | 0.3 | 0.3 |
| Carnauba Wax | 0.1 | 0.1 | 0.1 | 0.1 |
| Cooling Agent* | 0.14 | 0.02 | 0.11 | 0.14 |
| Sweetener | 0.2 | 0.15 | 0.6 | 0.6 |

*Cooling agent used in the examples may contain ML, MS, MGK, AC, PMC, TCA or combinations In the examples of tables 47 and 48, menthol is dissolved into the flavor along with the physiological cooling agent. Half of this mixture is applied at each of coats 8 and 14. After the coating is completed and allowed to stand overnight, the pellets are polished with carnauba wax. In the case of hydrogenated isomaltulose and maltitol, gum arabic may be used as a precoat with hydrogenated isomaltulose or maltitol, or dusted with powdered hydrogenated isomaltulose or maltitol then coated with a hydrogenated isomaltulose or maltitol solution.

Other coated gum products can be made with other flavors as well. Menthol and/or physiological cooling agents may enhance these various types of flavors such as menthol-eucalyptus, spearmint-menthol, cinnamon-menthol, and even fruity mint-menthol. The formulations for various flavored centers are found in tables 49 and 50.

TABLE 49

VARIOUS-FLAVORED CENTERS

|  | Ex. 249 | Ex. 250 | Ex. 251 | Ex. 252 |
|---|---|---|---|---|
| Base | 30.0 | 30.0 | 30.0 | 30.0 |
| Calcium Carbonate | 11.0 | 11.0 | 11.0 | 11.0 |
| Sorbitol | 51.6 | 50.6 | 50.8 | 52.05 |
| Glycerin | 5.0 | 5.0 | 5.0 | 4.0 |
| Encap. Sweetener | 0.5 | 0.5 | 0.5 | 0.5 |
| Flavor | $1.0^A$ | $1.5^B$ | $1.4^B$ | $1.6^C$ |
| Menthol | 0.2 | 0.4 | 0.3 | 0.2 |
| Cooling agent* | 0.1 | — | 0.1 | 0.05 |
| Lecithin | 0.6 | 0.6 | 0.6 | 0.6 |
| Encap. Menthol | — | 0.4 | 0.3 | — |

$^A$Spearmint Flavor
$^B$Menthol-Eucalyptus Flavor
$^C$Cinnamon-Menthol Flavor
*Cooling agent used in the examples may contain ML, MS, MGK, AC, PMC, TCA or combinations

TABLE 50

VARIOUS-FLAVORED CENTERS

|  | Ex. 253 | Ex. 254 | Ex. 255 |
|---|---|---|---|
| Base | 30.0 | 30.0 | 30.0 |
| Calcium Carbonate | 11.0 | 11.0 | 11.0 |
| Sorbitol | 51.9 | 49.3 | 49.3 |
| Glycerin | 4.0 | 7.0 | 7.0 |
| Encap. Sweetener | 0.5 | 0.6 | 0.6 |
| Flavor | $1.6^C$ | $1.2^D$ | $1.2^D$ |
| Menthol | 0.2 | 0.2 | 0.1 |
| Cooling Agent* | 0.2 | 0.1 | 0.2 |
| Lecithin | 0.6 | 0.6 | 0.6 |
| Encap. Menthol | — | — | — |

$^C$Cinnamon-Menthol Flavor
$^D$Fruity-mint Menthol Flavor
*Cooling agent used in the examples may contain ML, MS, MGK, AC, PMC, TCA or combinations The various-flavored center formulas may be coated with polyols such as xylitol, maltitol, lactitol, hydrogenated isomaltulose or sorbitol and have a physiological cooling agent added to the coating. Examples of coated chewing gum having various flavors are found in tables 51 and 52.

TABLE 51

VARIOUS-FLAVORED COATED CHEWING GUMS

|  | Ex. 256 | Ex. 257 | Ex. 258 | Ex. 259 |
|---|---|---|---|---|
| Center | Ex. 249 | Ex. 250 | Ex. 251 | Ex. 252 |
| Xylitol | 89.7 | 89.1 | — | 89.2 |
| Gum Arabic | 8.8 | 8.8 | 2.8 | 8.8 |
| Titanium Dioxide | 0.8 | 0.8 | 0.8 | 0.8 |
| Hydrogenated isomaltulose | — | — | 95.0 | — |
| Maltitol | — | — | — | — |
| Flavor | $0.4^A$ | $0.6^B$ | $0.6^B$ | $0.8^C$ |
| Menthol | 0.1 | 0.4 | 0.3 | 0.2 |
| Carnauba Wax | 0.1 | 0.1 | 0.1 | 0.1 |

TABLE 51-continued

VARIOUS-FLAVORED COATED CHEWING GUMS

|  | Ex. 256 | Ex. 257 | Ex. 258 | Ex. 259 |
|---|---|---|---|---|
| Cooling Agent* | 0.1 | 0.2 | 0.2 | 0.1 |
| Sweeteners | — | — | 0.2 | — |

$^A$Spearmint Flavor
$^B$Menthol-Eucalyptus Flavor
$^C$Cinnamon-Menthol Flavor
*Cooling agent used in the examples may contain ML, MS, MGK, AC, PMC, TCA or combinations

TABLE 52

VARIOUS-FLAVORED COATED CHEWING GUMS

|  | Ex. 260 | Ex. 261 | Ex. 262 |
|---|---|---|---|
| Center | Ex. 253 | Ex. 254 | Ex. 255 |
| Xylitol | — | 89.7 | — |
| Gum Arabic | 2.8 | 8.8 | 2.8 |
| Titanium Dioxide | 0.8 | 0.8 | 0.8 |
| Hydrogenated isomaltulose | 94.9 | — | — |
| Maltitol | — | — | 95.6 |
| Flavor | $0.8^C$ | $0.3^D$ | $0.3^D$ |
| Menthol | 0.2 | 0.1 | 0.1 |
| Carnauba Wax | 0.1 | 0.1 | 0.1 |
| Cooling Agent* | 0.2 | 0.2 | 0.1 |
| Sweeteners | 0.2 | — | 0.2 |

$^C$Cinnamon-Menthol Flavor
$^D$Fruity-mint Menthol Flavor
*Cooling agent used in the examples may contain ML, MS, MGK, AC, PMC, TCA or combinations Breath Freshening Examples To evaluate chewing gum formulations made with a cinnamon flavor and low levels of mint flavor, along with physiological cooling agents for breath freshening, the following samples were made:

TABLE 53

|  | Example 263 (comparative) | Example 264 | Example 265 | Example 266 |
|---|---|---|---|---|
| Gum Base | 19.46% | 19.46% | 19.46% | 19.46% |
| Cinnamon Flavor | 1.29% | 1.29% | 1.29% | 1.39% |
| Peppermint Flavor | 0.10% | 0.10% | 0.10% | — |
| WS-3 | — | 0.10% | 0.10% | 0.10% |
| Menthone | — | — | 0.20% | — |
| Glycerol Ketal |  |  |  |  |
| Sugar | 62.24% | 62.14% | 61.94% | 62.14% |
| Corn Syrup | 15.57% | 15.57% | 15.57% | 15.57% |
| Glycerin | 0.67% | 0.67% | 0.67% | 0.67% |
| Color | 0.67% | 0.67% | 0.67% | 0.67% |
| TOTAL | 100.00 | 100.00 | 100.00 | 100.00 |

Informal evaluation showed Examples 263, 264 and 265 samples to have a clean cinnamon flavor with only a slight mint note. However, Examples 264, 265 and 266 had noticeably higher cooling.

A trained panel of eight chewers were given a cracker smeared with garlic/onion cream cheese. They then chewed the gums of Examples 263 (comparative) and 264 (inventive) and rated "Fresh Breath", "Odor" and "Effectiveness for Breath Freshening" at 0.5, 1, 2, 3, 4, 5, 6, 7, 9, 11, 13 and 15 minutes. The gum was discarded and additional ratings were made at 5 and 10 minutes afterward (P5, P10). As can be seen from the graphs of FIGS. 1-3, which show the test results, the inventive composition had significantly better scores for each of the three rated properties.

Figure 2:
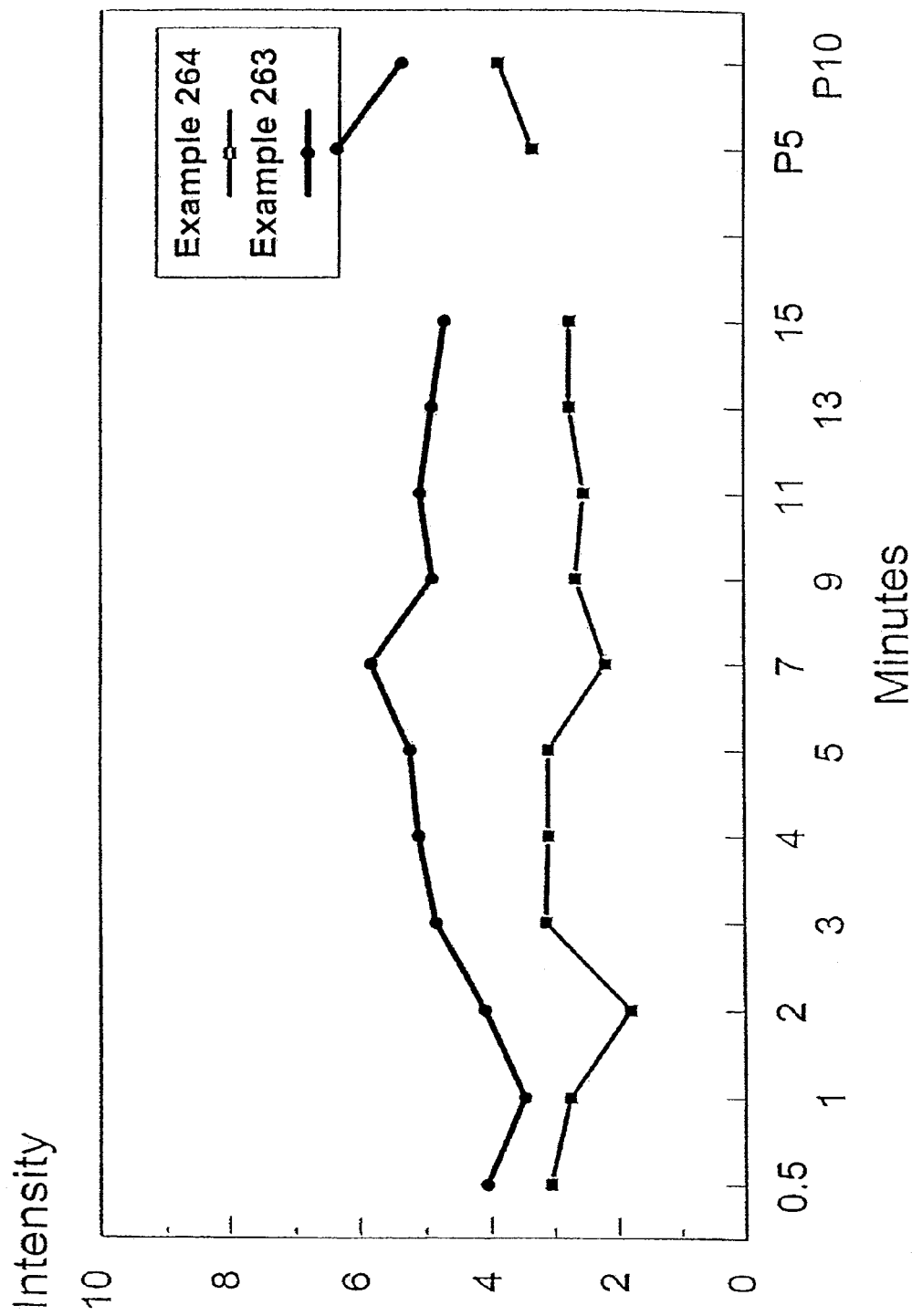
FIG. 2 is a graph showing a rating of perceived breath odor over time after chewing comparative and inventive gum samples.
Figure 3:
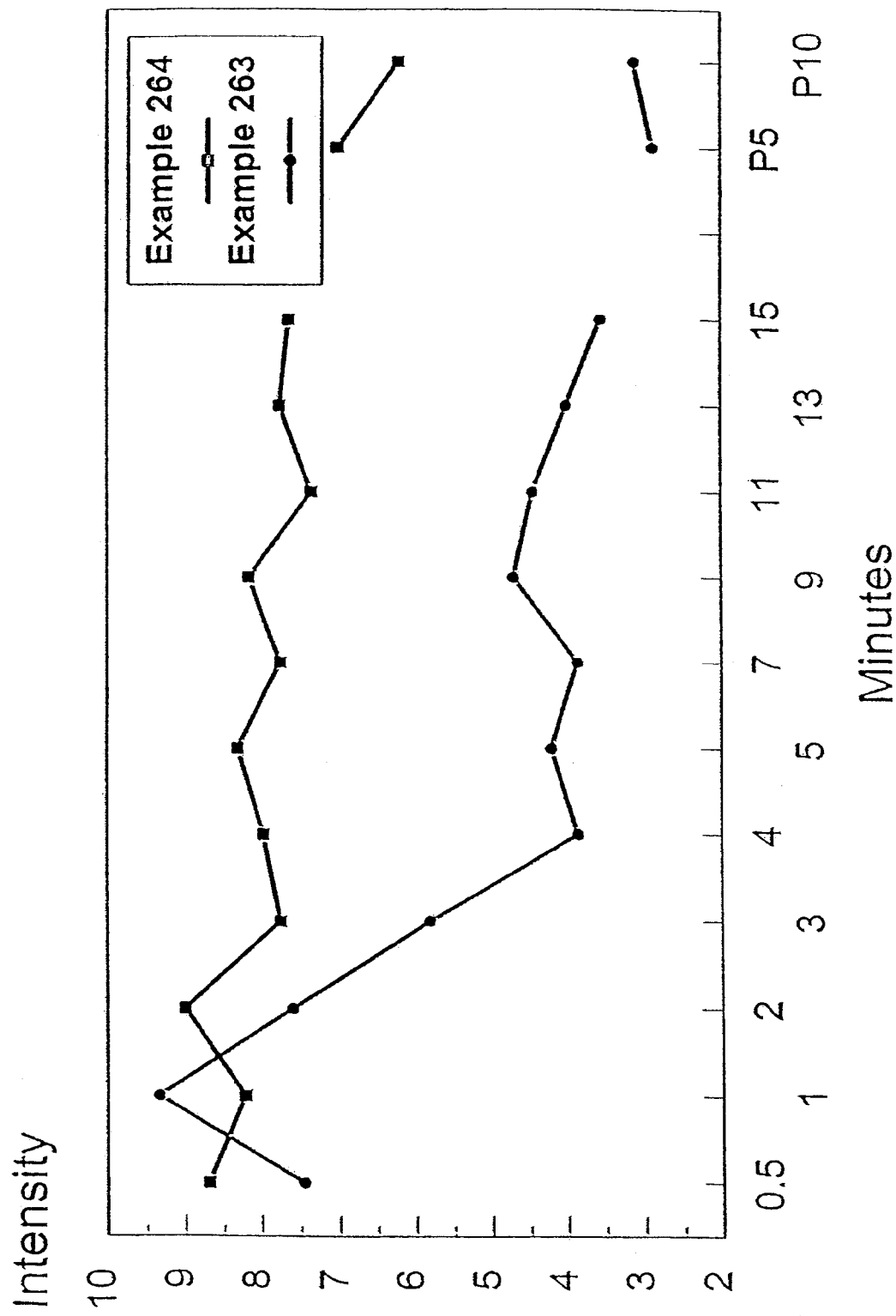
FIG. 3 is a graph showing a rating of perceived effectiveness for breath freshening over time after chewing comparative and inventive gum samples.

In FIG. 1 it can be seen that the inventive gum (Example 264) produced generally higher scores for breath freshness. FIG. 2 rates the odor of the breath, and the Example 264 inventive gum produced lower odor ratings than the comparative gum (Example 263). FIG. 3 shows that the effectiveness for breath freshening was considered generally higher for the inventive gum (Example 264) than for the comparative gum (Example 263).

The following formulas are also illustrative of the invention.

TABLE 54

|  | Example 267 | Example 268 | Example 269 |
| --- | --- | --- | --- |
| Gum Base | 24.00% | 24.00% | 24.00% |
| Sorbitol | 55.10% | 55.00% | 55.00% |
| Mannitol | 7.00% | 7.00% | 7.00% |
| Hydrogenated Starch Hydrolysate Syrup | 6.50% | 6.50% | 6.50% |
| Glycerin | 5.00% | 5.00% | 5.00% |
| Cinnamon Flavor | 1.30% | 1.30% | 1.30% |
| WS-3 | — | 0.10% | 0.20% |
| Menthone Glycerol Ketal | 0.20% | 0.20% | 0.10% |
| Red Color | 0.50% | 0.50% | 0.50% |
| Aspartame | 0.15% | 0.15% | 0.15% |
| Encapsulated Aspartame | 0.25% | 0.25% | 0.25% |
| TOTAL | 100.00 | 100.00 | 100.00 |

The samples will have a clean cinnamon flavor and enhanced breath freshening.

TABLE 55

|  | Example 270 | Example 271 | Example 272 |
| --- | --- | --- | --- |
| Gum Base | 24.00% | 24.00% | 24.00% |
| Sorbitol | 55.00% | 55.00% | 54.90% |
| Mannitol | 7.00% | 7.00% | 7.00% |
| Hydrogenated Starch Hydrolysate Syrup | 6.50% | 6.50% | 6.50% |
| Glycerin | 5.00% | 5.00% | 5.00% |
| Cinnamon Flavor | 1.30% | 1.30% | 1.30% |
| WS-23 | — | 0.10% | 0.20% |
| Menthyl Lactate | 0.20% | 0.20% | 0.10% |
| Red Color | 0.50% | 0.50% | 0.50% |
| Aspartame | 0.15% | 0.15% | 0.15% |
| Encapsulated Aspartame | 0.25% | 0.25% | 0.25% |
| Menthyl Succinate | 0.10% | — | 0.10% |
| TOTAL | 100.00 | 100.00 | 100.00 |

The samples will have a clean cinnamon flavor and enhanced breath freshening.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A method of improving the flavor impact of a coated chewing gum comprising the step of adding a physiological cooling agent comprising N-2,3-trimethyl-2-isopropyl butanamide and N-ethyl-p-menthane-3-carboxamide to the coating, wherein the coating comprises a material selected from the group consisting of maltitol, lactitol, erythritol, sorbitol, hydrogenated isomaltulose and combinations thereof.

2. A method of coating a chewing gum comprising the steps of:
   a) providing a chewing gum center; and
   b) coating the center with a coating comprising:
      i) a coating material; and
      ii) a physiological cooling agent comprising N-2,3-trimethyl-2-isopropyl butanamide and N-ethyl-p-menthane-3-carboxamide.

3. The method of claim 2 wherein the coating material is a polyol other than xylitol.

4. A coated chewing gum having a clean cooling sensory perception comprising:
   a) a chewing gum center; and
   b) a coating comprising:
      i) a coating material; and
      ii) a physiological cooling agent comprising N-2,3-trimethyl-2-isopropyl butanamide and N-ethyl-p-menthane-3-carboxamide.

5. The coated chewing gum of claim 4 wherein the coating material is a polyol other than xylitol.

* * * * *